(12) United States Patent
Elliot et al.

(10) Patent No.: US 7,361,052 B2
(45) Date of Patent: Apr. 22, 2008

(54) MULTIMEDIA OUTLET BOX

(75) Inventors: Douglas G. Elliot, Waconia, MN (US); Loren J. Mattson, Richfield, MN (US); Terry E. McClellan, Maple Grove, MN (US); Robert J. Debrey, Edina, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/729,284

(22) Filed: Mar. 28, 2007

(65) Prior Publication Data

US 2007/0173111 A1     Jul. 26, 2007

Related U.S. Application Data

(63) Continuation of application No. 09/495,655, filed on Feb. 1, 2000, now Pat. No. 7,220,144.

(51) Int. Cl.
*H01R 13/60* (2006.01)

(52) U.S. Cl. .................................................. 439/535

(58) Field of Classification Search ........ 439/171–175, 439/131, 132, 535, 536
See application file for complete search history.

(56) References Cited

U.S. PATENT DOCUMENTS

| | | |
|---|---|---|
| 4,725,249 A | 2/1988 | Blackwood et al. |
| 4,993,970 A | 2/1991 | Littrell |
| 4,995,688 A | 2/1991 | Anton et al. |
| 5,066,149 A | 11/1991 | Wheeler et al. |
| 5,069,523 A | 12/1991 | Finzel et al. |
| 5,096,431 A | 3/1992 | Byrne |
| 5,115,489 A | 5/1992 | Norris |
| 5,122,069 A | 6/1992 | Brownlie et al. |
| 5,174,293 A | 12/1992 | Hagiwara |
| 5,511,144 A | 4/1996 | Hawkins et al. |
| 5,559,922 A | 9/1996 | Arnett |
| 5,659,650 A | 8/1997 | Arnett |
| 5,676,566 A | 10/1997 | Carlson, Jr. et al. |
| 5,717,811 A | 2/1998 | Macken |
| 5,769,646 A | 6/1998 | Cavello et al. |
| 5,781,686 A | 7/1998 | Robinson et al. |
| 5,807,139 A | 9/1998 | Volansky et al. |
| 5,947,765 A | 9/1999 | Carlson, Jr. et al. |

(Continued)

FOREIGN PATENT DOCUMENTS

| | | |
|---|---|---|
| WO | WO 96/19745 | 6/1996 |
| WO | WO 00/17693 | 3/2000 |

OTHER PUBLICATIONS

Exhibit A ADC Telecommunications catalog entitled "FL2000 System Second Edition," dated Jan. 1995, 43 pages.

(Continued)

*Primary Examiner*—Briggitte R. Hammond
(74) *Attorney, Agent, or Firm*—Merchant & Gould P.C.

(57) ABSTRACT

The present disclosure relates to relates to a telecommunications outlet box including a peripheral wall that is primarily curved except for a portion in which a connector access opening of the box is defined. The present disclosure also relates to a telecommunications outlet box having a cradle in which a cable management spool is retained. The present disclosure further relates to a cable guide for use with a telecommunications outlet box. The cable guide projects outward from a connector access opening of the outlet box and provides a protective shield around cables connected to the outlet box.

20 Claims, 24 Drawing Sheets

U.S. PATENT DOCUMENTS

| | | |
|---|---|---|
| 6,077,108 A | 6/2000 | Lorscheider et al. |
| 6,114,623 A | 9/2000 | Bonilla et al. |
| 6,315,598 B1 | 11/2001 | Elliot et al. |
| 6,350,151 B1 | 2/2002 | Elliot et al. |

OTHER PUBLICATIONS

Exhibit B "ODF-system MAXI Hög termineringskapacitet—Full flexibilitet", *TykoFlexAB*, 4 pages (dated Nov. 27, 1996).

Brochure for the Panduit® Mini-Com® In-Wall Fiber Spool, pp. B17-B18 (on sale prior to Feb. 1, 2000). 1999 Catalog, The Siemon Company, pp. 15.4-15.5; 1.9; 1.30-1.35.

MULTIMEDIA OUTLET BOX

CROSS-REFERENCE TO RELATED APPLICATION

This application is a continuation of application Ser. No. 09/495,655, filed Feb. 1, 2000, now U.S. Pat. No. 7,220,144, issued May 22, 2007, which application is incorporated herein by reference.

FIELD OF THE INVENTION

The present invention relates generally to telecommunications equipment. More specifically, the present invention relates to enclosures such as outlet boxes for housing adapters/receptacles capable of providing connections between telecommunication transmission lines.

BACKGROUND OF THE INVENTION

Multimedia outlet boxes (e.g., surface/wall mount boxes and free standing boxes) typically house a plurality of telecommunications connectors (e.g., adapters, modular jacks, etc.) used to provide interconnections between telecommunication transmission lines. Different types of telecommunications connectors (e.g., modular jacks for receiving twisted pair plugs, BNC coax adapters, F-type adapters, RCA adapters or connectors, SC fiber adapters, ST fiber adapters, etc.) are frequently provided at the outlet boxes to allow the outlet boxes to be compatible with different types of transmission lines. This allows a single outlet box to be used to configure a work station area with various types of transmission lines for different applications.

Cable management is extremely important in the telecommunications industry. Effective cable management prevents cables from becoming intertwined and enhances signal transmission quality by ensuring that minimum bend radius requirements are maintained. The protection of connection regions from impact related damage and the prevention of contamination are other important considerations.

SUMMARY OF THE INVENTION

One aspect of the present invention relates to an outlet box including a housing having a first side positioned opposite from a second side. At least one of the first and second sides forms a base of the housing. The housing also includes a peripheral wall that extends between the first and second sides of the housing. The peripheral wall includes a first portion having a first outer face that extends between oppositely positioned first and second edges, and a second portion having a second outer face that is separate from the first outer face. The first and second edges are oriented to extend between the first and second sides of the housing. The first portion of the peripheral wall defines a connector access opening that is elongated and that extends longitudinally between the first and second edges of the first outer face. The second outer face is configured to curve continuously about a periphery of the housing from the first edge to the second edge. The outlet box also includes a connector holder positioned adjacent to the connector access opening of the housing.

Another aspect of the invention relates to an outlet box having a housing with multiple positions for mounting a connector holder. For example, the housing can be configured to allow the connector holder to be mounted at a first location that is adjacent to a connector access opening, and a second location that is recessed within the housing relative to the first location. A user can mount the connector holder at either one of the first and second locations.

A variety of advantages of the invention will be set forth in part in the description that follows, and in part will be apparent from the description, or may be learned by practicing the invention. It is to be understood that both the foregoing general description and the following detailed description are explanatory and exemplary only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
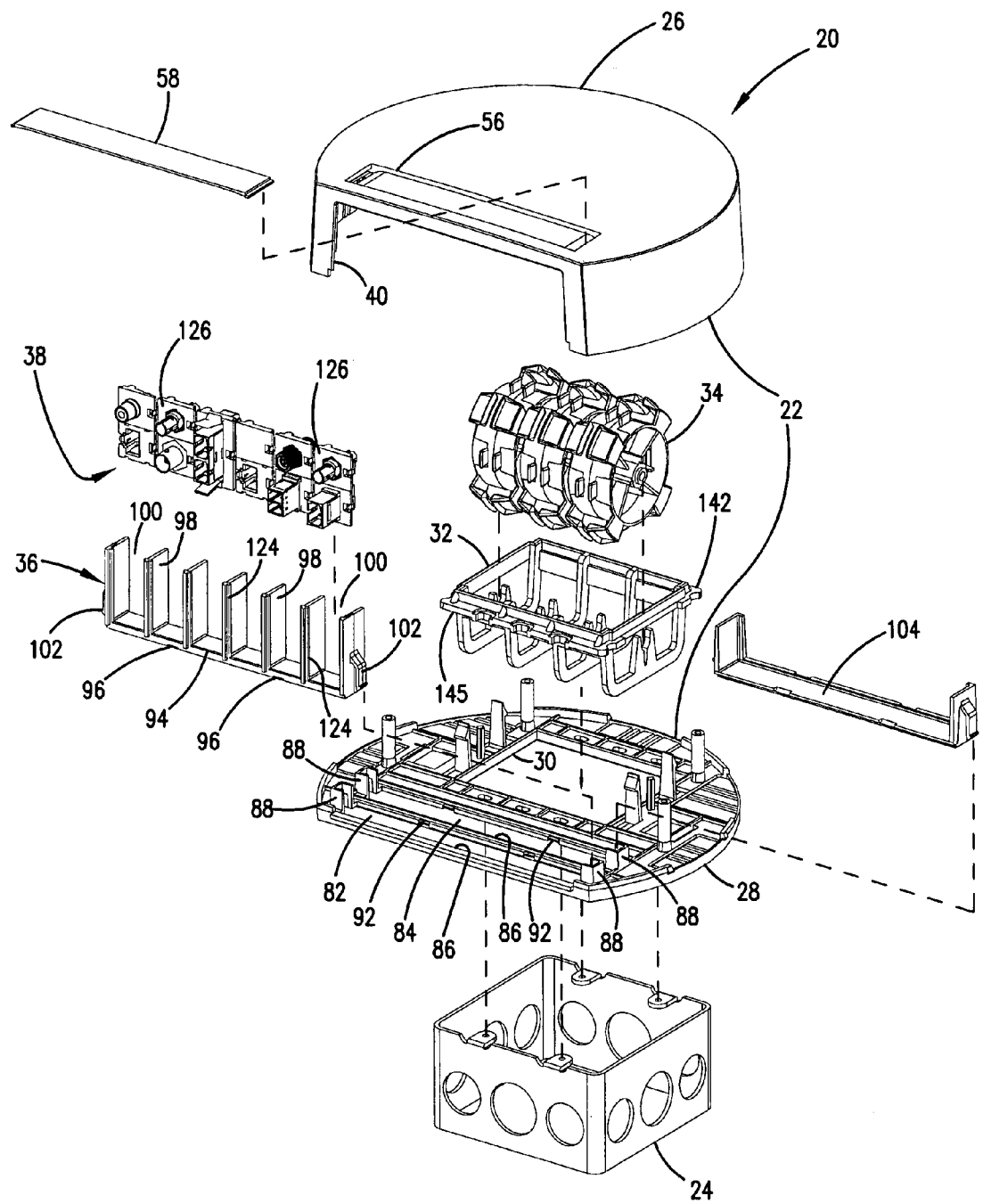
FIG. 1 is an exploded, perspective view of an outlet box constructed in accordance with the principles of the present invention.

FIG. 1 illustrates a multimedia outlet box 20 constructed in accordance with the principles of the present invention. The outlet box 20 includes a housing 22 adapted for connection to a National Electrical Manufacturers Association (NEMA) electric enclosure 24 (i.e., a NEMA box) or other type of enclosure (e.g., a mud ring). The housing 22 includes a cover 26 adapted to be mounted over a base 28. The base 28 defines a main opening 30 for providing communication with the interior of the enclosure 24. A cradle 32 is provided for securing a plurality of cable management spools 34 to the housing 22. The cradle 32 is sized to nest or otherwise be received within the main opening 20 of the base 28. The outlet box 20 also includes a connector holder 36 for use in mounting a plurality of connectors 38 within the housing 22.

Figure 2:
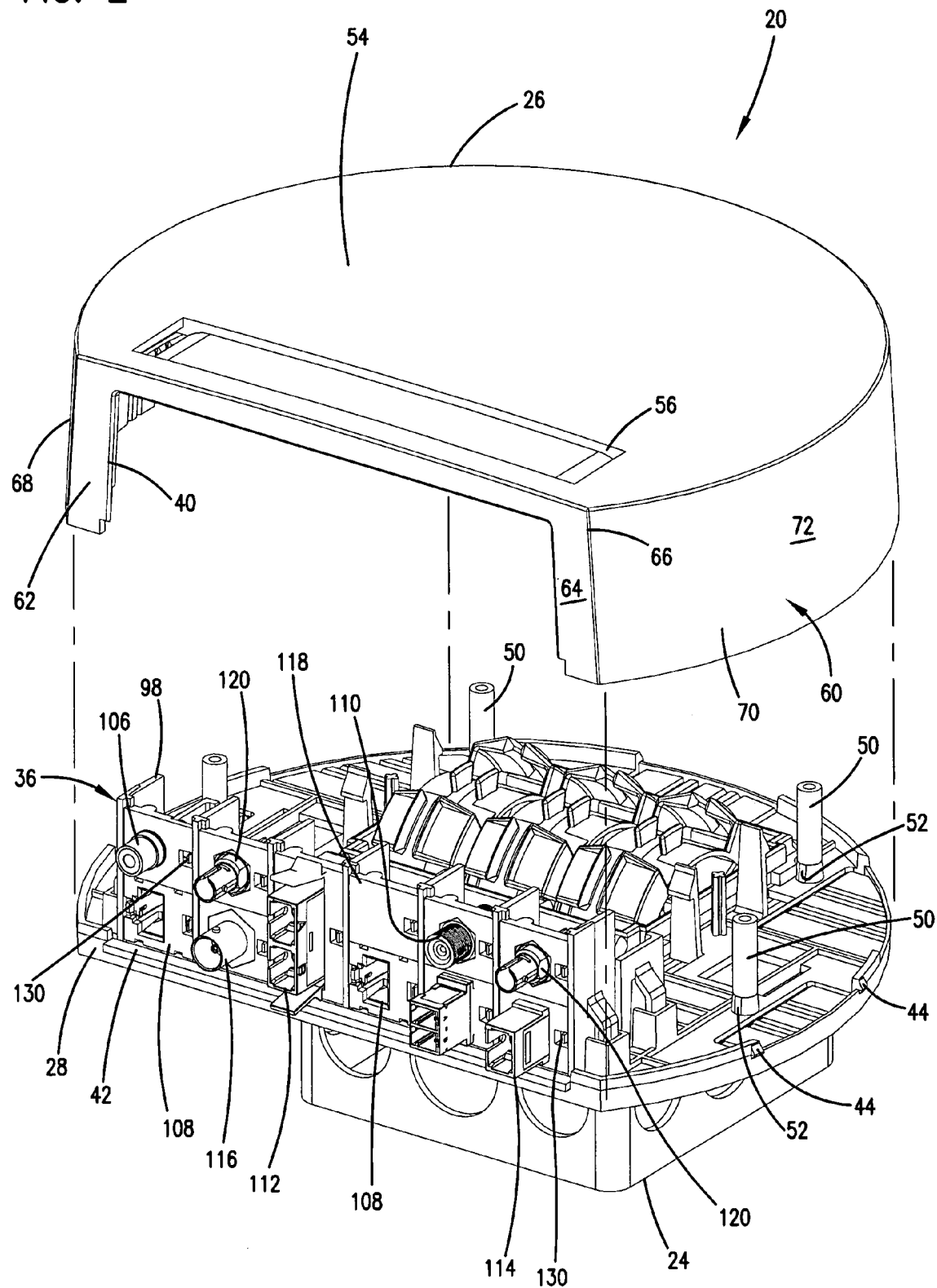
FIG. 2 is an assembled, perspective view of the outlet box of FIG. 1 with the cover removed.
Figure 3:
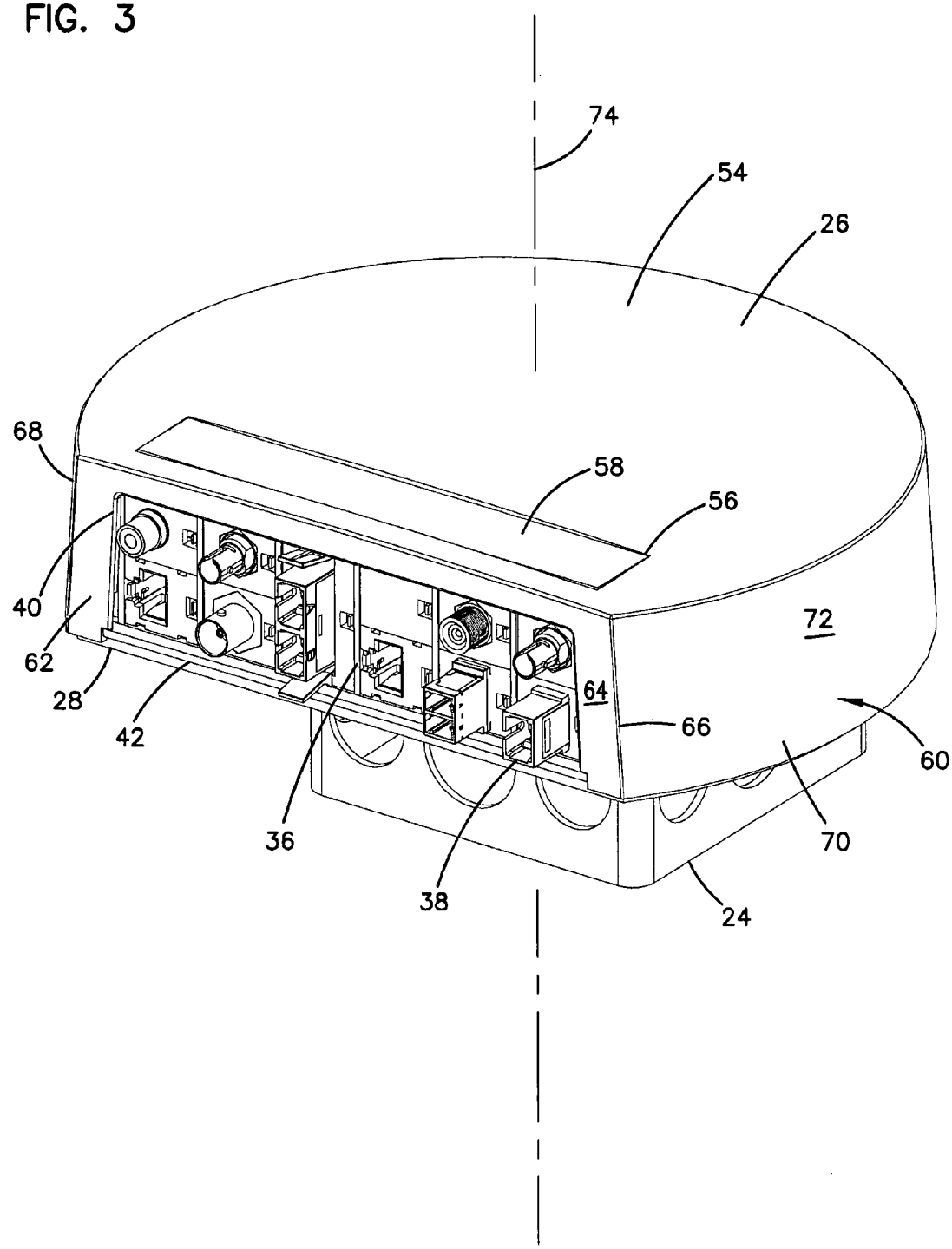
FIG. 3 is a perspective view of the outlet box of FIG. 1 fully assembled.

FIG. 2 illustrates the outlet box 20 with the base 28 mounted on the enclosure 24. Preferably, the base 28 is connected to the enclosure 24 by conventional fasteners (not shown) such as bolts or screws. The connector holder 36 is shown mounted directly adjacent to a linear peripheral edge 42 of the base 28. As so positioned, when the cover 26 is mounted on the base 28 as shown in FIG. 3, the connectors 38 within the connector holder 36 project outward through a connector access opening 40 defined by the cover 26.

Preferably, the housing cover 26 is mounted on the base 28 by a technique that allows the cover 26 to be easily removed. For example, as shown in the Figures, the cover 26 is connected to the base 28 by a snap-fit connection provided by a plurality of ramped tabs 44 (shown in FIG. 2) that project radially outward from a periphery of the base 28 and fit within corresponding notches 46 (shown in FIG. 10) formed in the cover 26.

Figure 4:
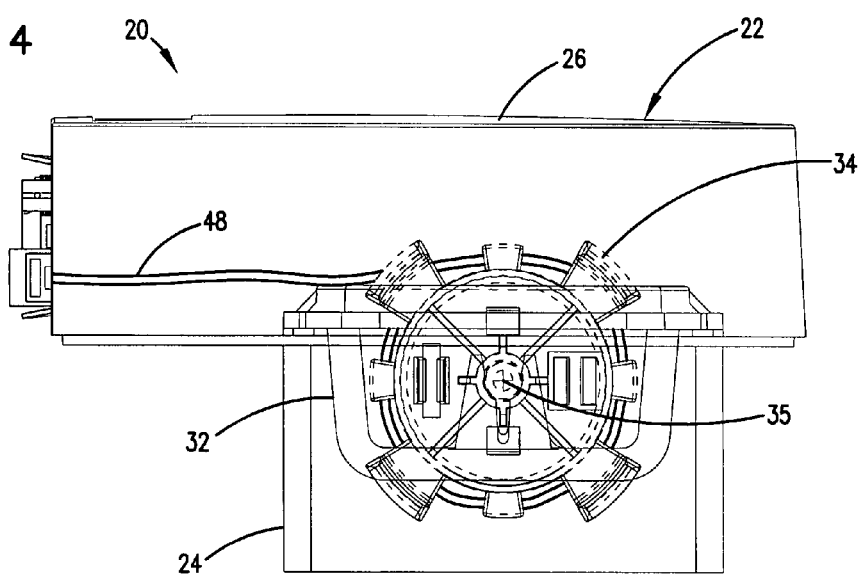
FIG. 4 is a side view of the outlet box of FIG. 3 which shows the positioning of the spool assembly within the outlet box.

The cradle 32 of the outlet box 20 is configured to project outside the housing 22 when the cradle 32 is mounted in the main opening 30 of the base 28. Consequently, when the outlet box 20 is mounted on the enclosure 24 as shown in FIGS. 3 and 4, the cradle 32 fits or extends inside the enclosure 24. As a result, the spools 34 within the cradle 32 are retained partially within the enclosure 24 and partially within the housing 22. Additionally, preferably the spools 34 are aligned along a central axis 35 (shown in FIG. 4) that is generally parallel with respect to the base. As used herein, the term "cradle" is intended to mean any structure capable of holding or retaining a spool.

As shown in FIG. 4, the spools 34 allow excess cable 48 (e.g., wire cable or fiber optic cable) within the housing 22 or the enclosure 24 to be managed by wrapping the excess cable 48 about the spools 34. By wrapping the cable 48 about the spools 34, cables are prevented from becoming tangled or excessively bent. Preferably, the cables are first wrapped around the spools 34, and then the spools are placed in the cradle 32. Subsequently, the outlet box 20 is placed over the enclosure 24. In concert with the movement of the outlet box 20, the cradle 32 and the spools 34 held therein are concurrently placed at least partially within the enclosure 24. With the cradle 32 and spools 34 so positioned, the outlet box can be fastened or otherwise secured to the enclosure 24.

To further promote cable management within the housing 22, a plurality of cable tie-downs are preferably provided in the housing 22. For example, referring to FIG. 2, a plurality of cylindrical tie-downs 50 are shown integrally formed with the base 28. The tie-downs 50 are each hollow and each include a transverse through-slot 52 for facilitating tying cable to the tie-downs 50.

Referring to FIGS. 2 and 3, the housing cover 26 includes a top side 54 that opposes the base 28 when the cover 26 is fastened to the base 28. The top side 54 defines a rectangular recess 56 in which a designation strip 58 can be mounted. The cover 26 also includes a peripheral wall 60 that extends transversely (i.e., vertically as shown in FIGS. 2 and 3) between the top side 54 of the cover 26 and the base 28 when the cover 26 is mounted on the base 28. The peripheral wall 60 includes a first portion 62 having a first outer face 64 that extends between oppositely positioned first and second edges 66 and 68. As shown in FIGS. 2 and 3, the first and second edges 66 and 68 extend transversely (i.e., vertically) between the base 28 and the top side 54 of the cover 26.

The first portion 62 of the peripheral wall 60 defines the connector access opening 40 of the outlet box 20. The connector access opening 40 is generally rectangular and is elongated in a direction that extends between the first and second edges 66 and 68. As shown in FIG. 3, the first outer face 64 is generally planar, but other configurations could also be used.

The peripheral wall 60 of the housing 22 also includes a second portion 70 having a second outer face 72 that is separated from the first outer face 64 by the first and second edges 66 and 68. Preferably, the second outer face 72 curves continuously from the first edge 66 about a periphery of the housing 22 to the second edge 68. As shown in FIG. 3, the second portion 70 of the peripheral wall 60 has a circular curvature that curves about a central axis 74 of the housing 22. However, it will be appreciated that other curvatures could also be used. Alternatively, the second portion 70 of the peripheral wall 60 could include multiple discrete chord-like portions.

Figure 5:
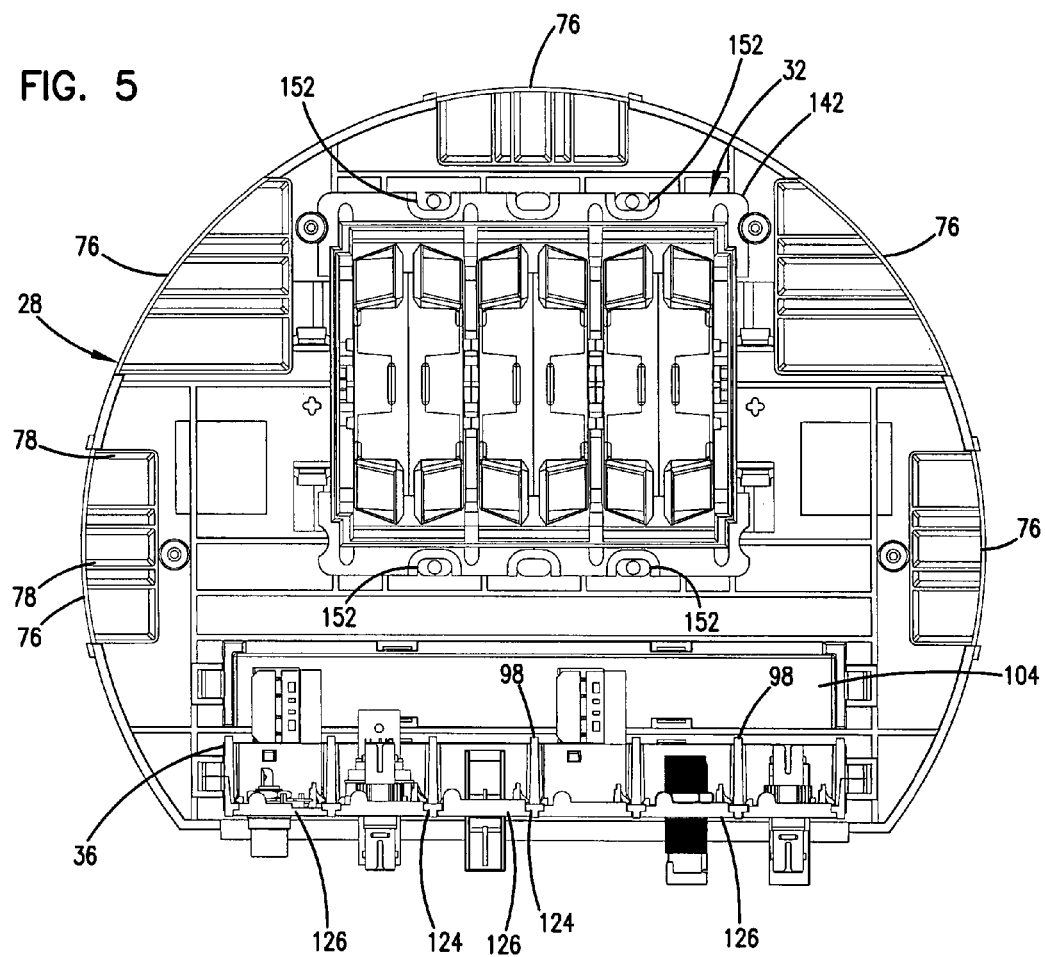
FIG. 5 is a top view of the outlet box of FIG. 3 with the cover removed.
Figure 6:
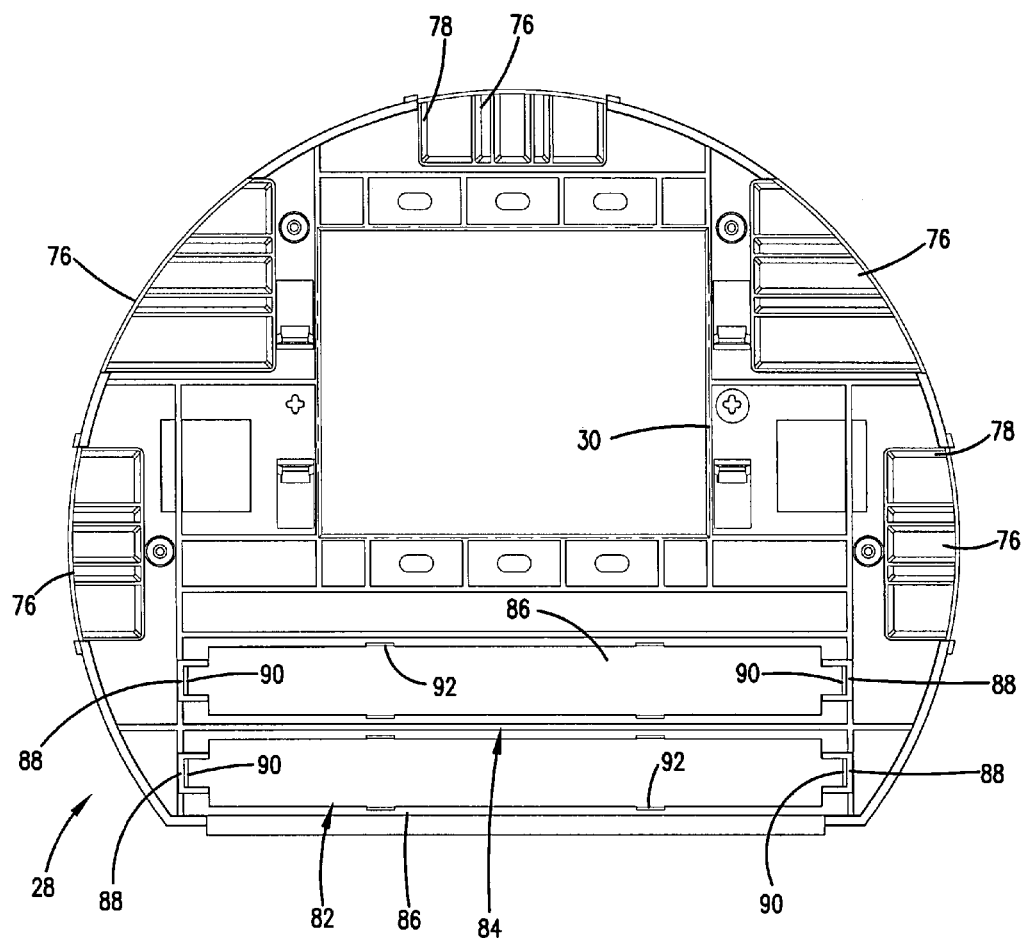
FIG. 6 is a top plan view of the base of the outlet box of FIG. 1.
Figure 7:
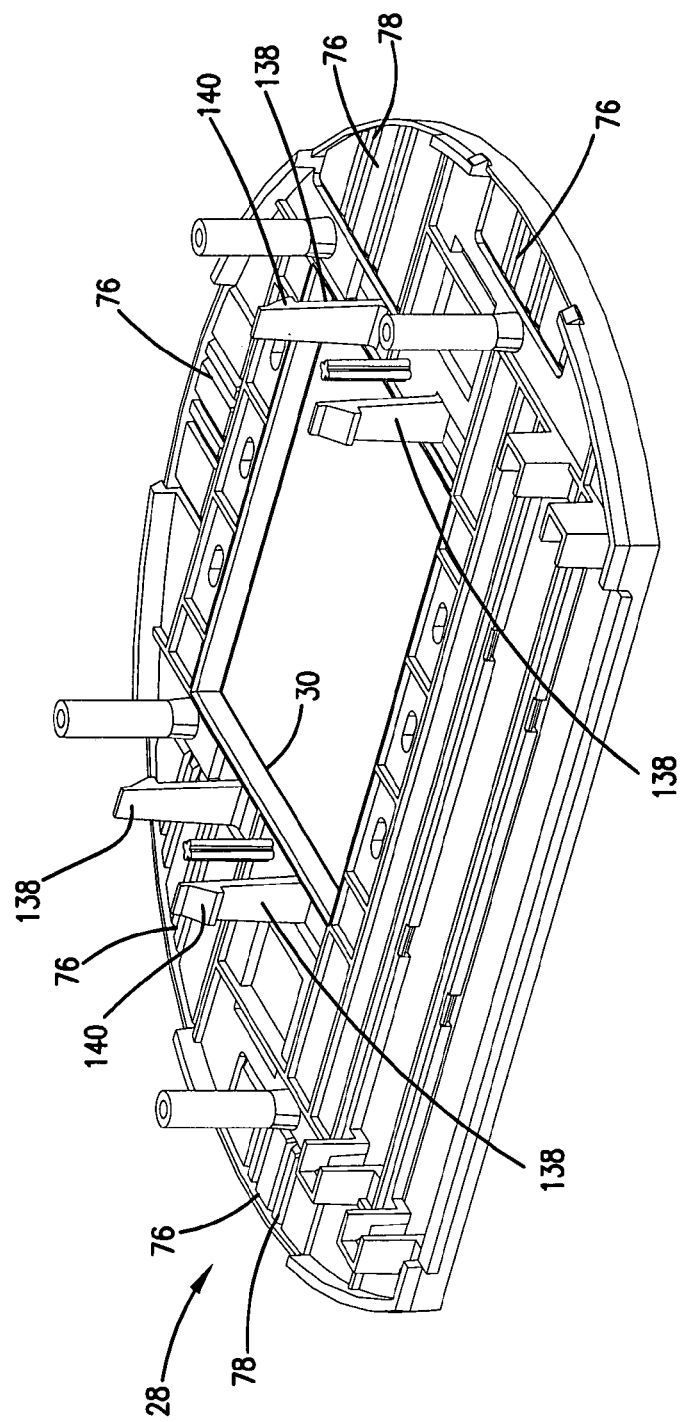
FIG. 7 is perspective view of the base of the outlet box of FIG. 1.
Figure 9:
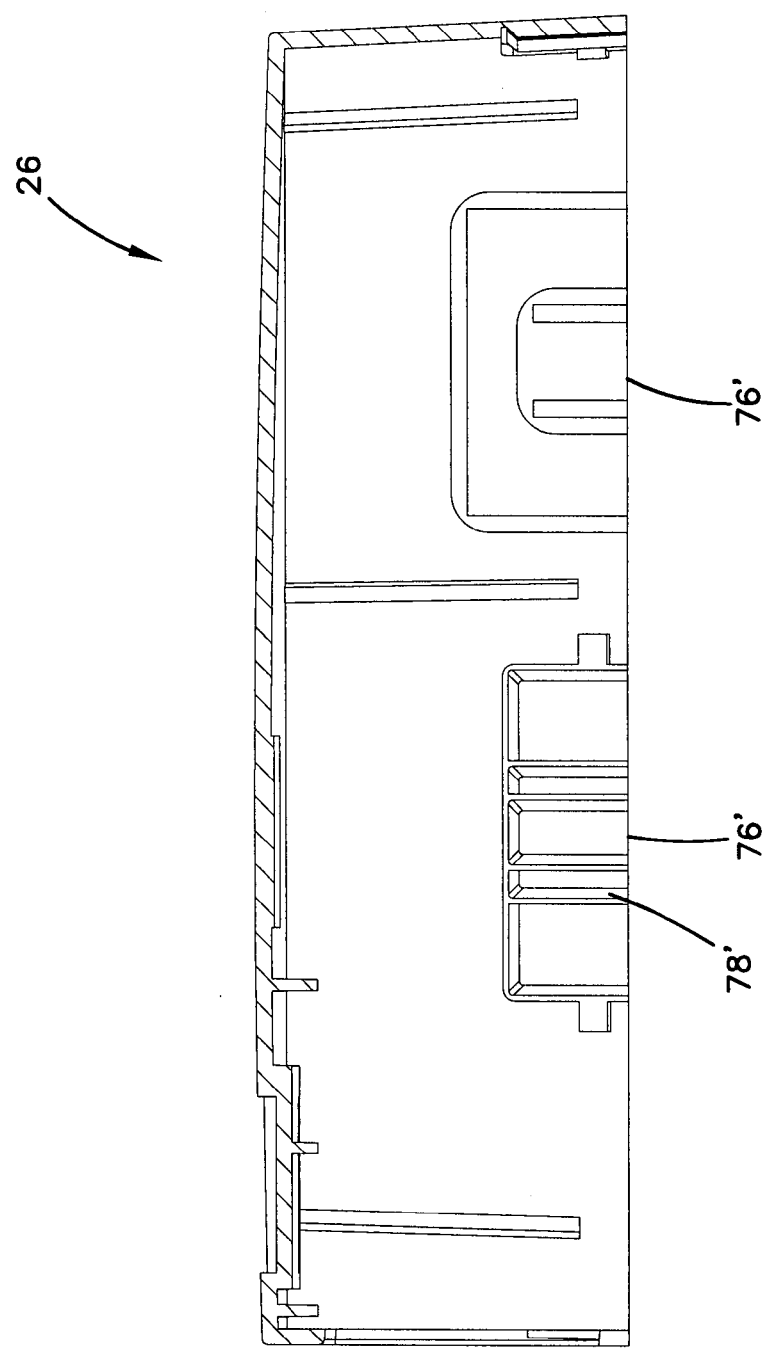
FIG. 9 is a cross-sectional view taken along section line 9-9 of FIG. 8.
Figure 10:
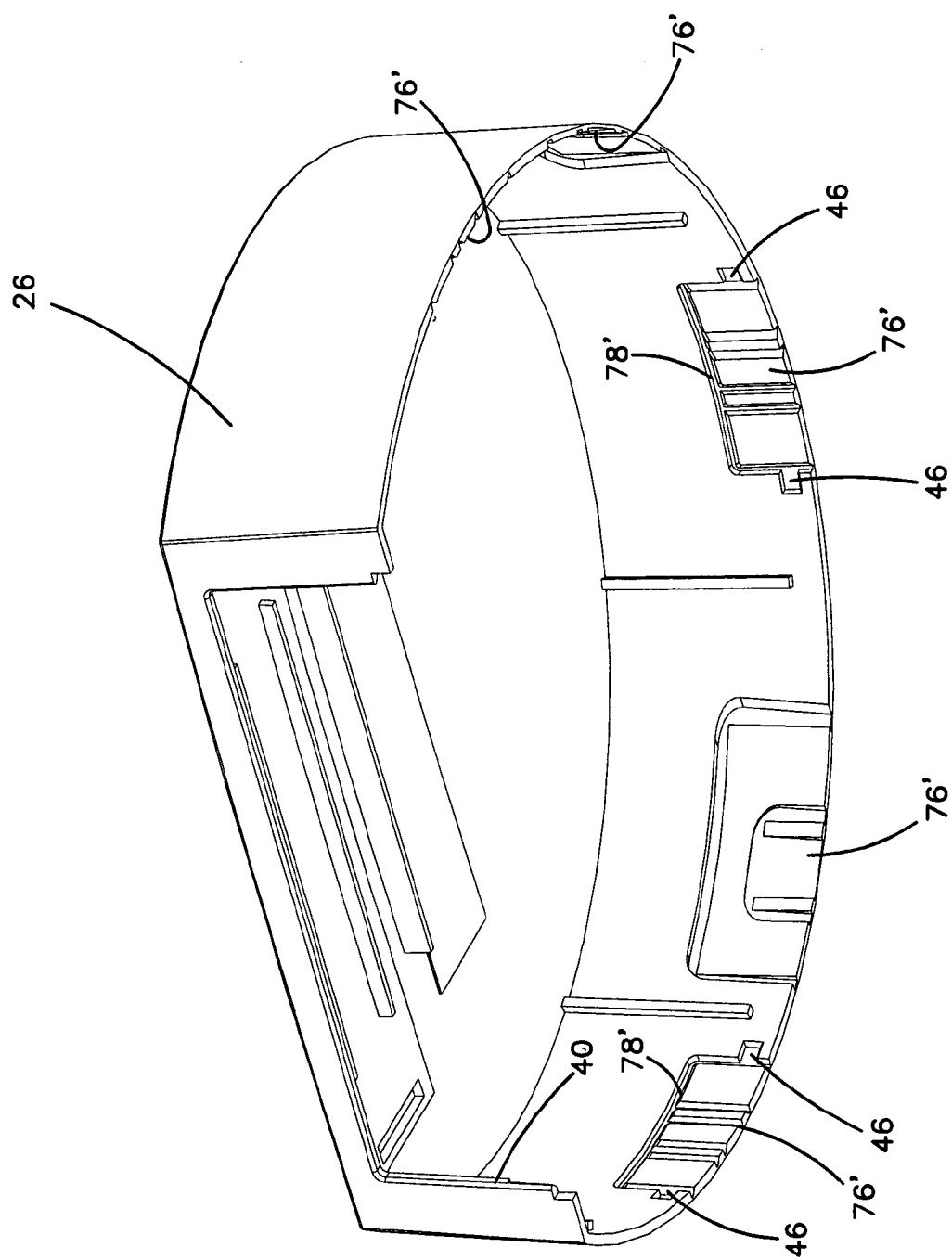
FIG. 10 is a perspective bottom view of the cover of the outlet box of FIG. 1.

Referring to FIGS. 5-7, the base 28 of the housing 22 defines a plurality of raceway insertion locations 76. Similarly, raceway insertion locations 76' are also formed in the peripheral wall 60 of the housing 22 as is best shown in FIGS. 9 and 10. Each of the raceway insertion locations 76' of the cover 26 is adapted to align with a corresponding one of the raceway insertion locations 76 of the base 28.

As shown in the Figures, the raceway insertion locations 76, 76' are break-outs that are defined by thinned or scored lines 78, 78' respectively formed in the base 28 and the peripheral wall 60. The lines 78, 78' provide a guide for helping an installer to cut or break the raceway insertion locations 76, 76' away from the housing 22 so as to form an opening for allowing a cable or a raceway (i.e., conduit) containing a cable to be inserted into the housing 22.

Figure 11:
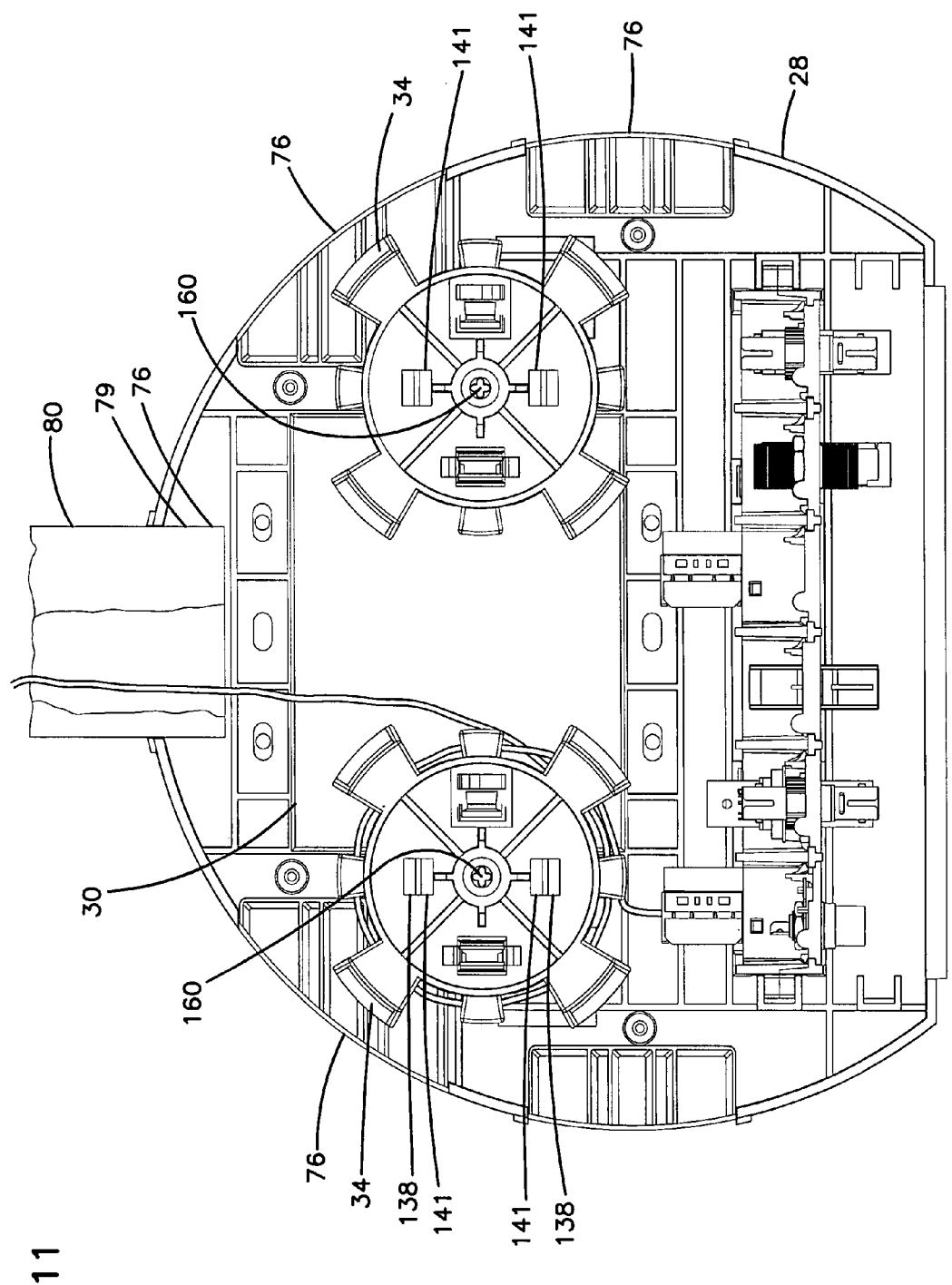
FIG. 11 is a top plan view of the base of the outlet box of FIG. 1 with two spools mounted on the base.

FIG. 11 shows one of the raceway insertion locations 76 removed to form an opening 79, and a raceway 80 inserted within the opening 79. It will be appreciated that to accommodate the raceway 80, the corresponding raceway insertion location 76' of the housing cover 26 (not shown in FIG. 11) will also be cut away. To accommodate raceways of different sizes, the lines 78, 78' divide the raceway insertion locations 76, 76' into multiple discrete sections that can be independently or jointly removed depending upon the size of the raceway desired to be inserted within the housing 22. While it is preferred to provide the cut-away lines 78, 78', alternatively, the raceway insertion locations can also be formed by precut openings provided in the housing 22.

Referring to FIG. 5, the raceway insertion locations 76 of the base 28 are spaced-apart along the curved region of the base such that each of the raceway insertion locations 76 faces outward from housing 22 at a different direction. For example, as shown in FIG. 5, raceway insertion locations 76 are provided generally at the 12 o'clock, 2 o'clock, 3 o'clock, 9 o'clock, and 10 o'clock positions relative to the central axis 74. While five raceway insertion locations 76 have been shown, it will be appreciated that one, two, three, four or more raceway insertion locations 76 can be provided. Frequently, the number of raceway insertion locations provided is a function of the size of the housing 22, with larger housings being able to accommodate more raceway insertion locations than smaller housings. It will further be appreciated that for each of the raceway insertion locations 76 shown in FIG. 5, a corresponding raceway insertion location 76' is provided around the peripheral wall 60 of the cover 26.

Referring again to FIG. 1, the base 28 of the housing 22 includes a first mounting structure 82 for mounting the connector holder 36 adjacent to the connector access opening 40, and a second mounting structure 84 for mounting the connector holder 36 at a position that is recessed within the housing 22 relative to the first mounting structure 82. The term "adjacent" is intended to mean that the connector holder 36 is mounted sufficiently close to the connector access opening 40 to allow the connectors 38 to either project out of the connector access opening 40, or be capable of being accessed through the connector access opening 40. When the connector holder 36 is mounted at the first mounting structure 82, some of the connectors 38 project out the connector access opening 40 as shown in FIG. 2. When the connector holder 36 is mounted at the second mounting structure 84, the connectors 38 are recessed within the housing but still can be accessed through the access opening 40. Hence, both of the mounting structures 82 and 84 are "adjacent" to the connector access opening 40.

Each of the first and second mounting structures 82 and 84 includes an elongated, rectangular opening 86, and upright channels 88 positioned at opposite ends of the rectangular opening 86. The openings 86 preferably extend completely through the base 28. Retaining shoulders 90 (best shown in FIG. 6) are provided in the upright channels 88. Retaining notches 92 are formed along the long sides of the rectangular openings 86.

Still referring to FIG. 1, the connector holder 36 includes a rectangular base 94 on which retaining tabs 96 are formed. The shape of the base 94 compliments the shape of the openings 86 (i.e., the base 94 is shaped to fit within and substantially block or fill the openings 86). The retaining tabs 96 correspond to the retaining notches 92 of the rectangular openings 86. The connector holder 36 also includes a plurality of dividers 98 that project upward from the base 94. The dividers 98 define a plurality of upright channels 100. Each channel has a lower end that is closed by the base 94 and an upper end that is open. The open upper ends of the channels 100 allow the connectors 38 to be slid or otherwise inserted downward into the channels 100.

The connector holder 36 further includes two cantilever-shaped retaining tabs 102 positioned at opposite ends of the connector holder 36. To mount the connector holder to the first retaining structure 82, the base 94 of the connector holder 36 is inserted downward into the rectangular opening 86 corresponding to the first mounting structure 82, and the resilient tabs 102 are concurrently inserted downward into the upright channels 88 corresponding to the first mounting structure 82. As so inserted, the retaining tabs 96 of the connector holder 36 snap into the retaining notches 92, and the retaining tabs 102 of the connector holder 36 snap past the retaining shoulders 90 in the upright channels 88. When the connector holder 36 is mounted at the first mounting structure 82, a blank strip 104 is preferably mounted at the second mounting structure 84.

If it is desired to recess the connectors 38 within the housing 22 (e.g., to afford greater protection to the connectors), the connector holder 36 can be mounted at the second mounting structure 84 as compared to the first mounting structure 82. It will be appreciated that the connector holder 36 is mounted at the second mounting structure 84 in the same manner previously described with respect to the first mounting structure 82. When the connector holder 36 is mounted at the second mounting structure 84, the blank strip 104 is preferably mounted at the first mounting structure 82.

While the first and second mounting structure 82 and 84 have been specifically described, it will be appreciated that any number of different types of mounting configurations could be used. For example, other types of snap-fit and press fit type connections can be used. Alternatively, fasteners can be used to mount the connector holder 36 at the different positions within the housing 22. Still further, slide fit connections in which at least portions of the connector holder are trapped or otherwise captured between opposing surfaces could also be used.

The connector holder 36 shown in FIG. 1 is preferably a 12-port connector holder. In other words, the connector holder 36 is configured for holding up to 12 different connectors at a single side of the outlet box 20. As best shown in FIG. 2, the connectors 38 held by the connector holder 36 include a variety of different types of connectors such as RCA connectors 106, modular jacks 108 for receiving plugs such as twisted pair type plugs, F-type adapters 110, duplex SC fiber adapters 112, single SC fiber adapters 114, BNC adapters 116, and ST fiber adapters 120. Blanks 118 can also be mounted in the connector holder 36.

Figure 5A:
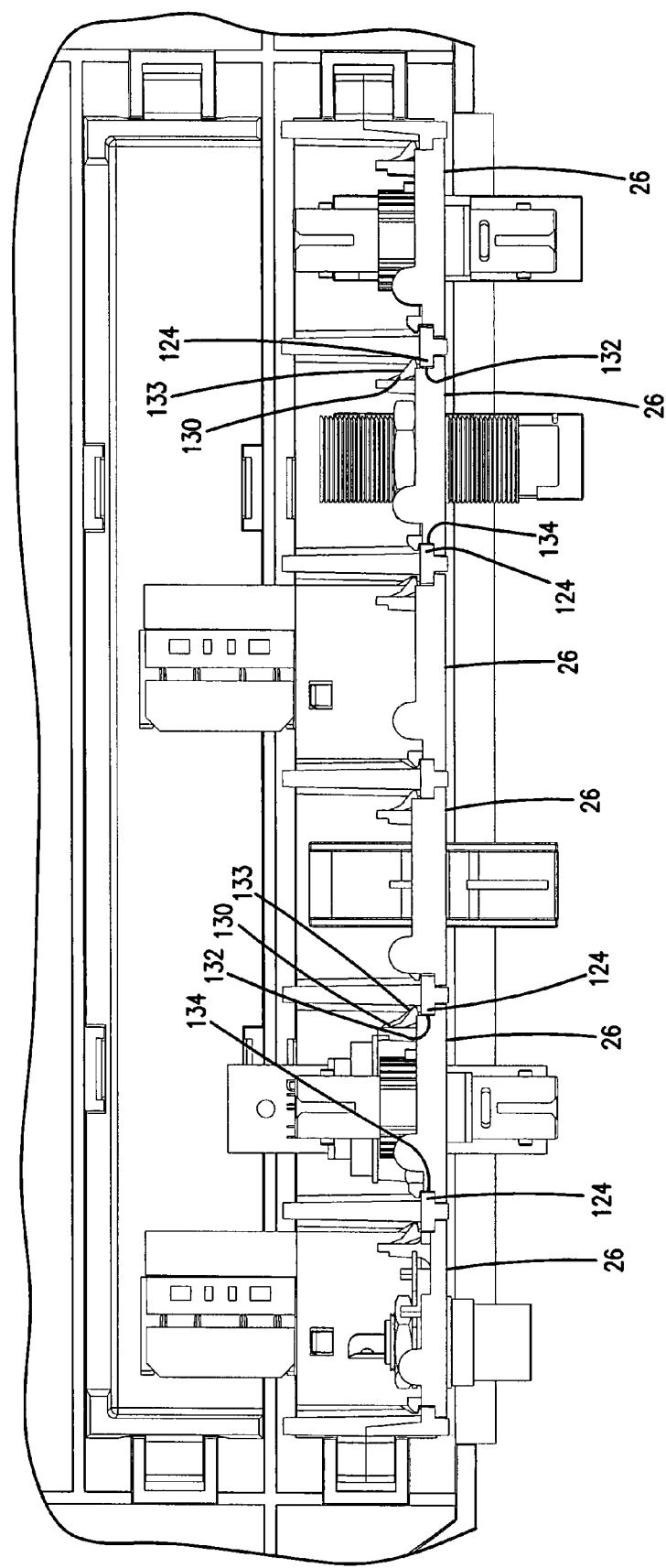
FIG. 5A is a detailed view of a portion of the outlet box of FIG. 5.

The dividers 98 of the connector holder 36 include elongated front lips 124 that extend longitudinally in an upright direction and that project into the channels 100. Each of the channels 100 includes an opposing pair of the front lips 124. The connectors 38 each have a profile for allowing the connectors to be secured within the channels 100. For example, referring to FIG. 5, the majority of the connectors 38 are mounted on mounting plates 126 configured to interlock with the front lips 124 of the connector holder 36. For example, as best shown in FIG. 5A, each of the mounting plates 126 is shown including oppositely positioned first and second channels 132 and 134 sized for receiving the front lips 124. The first channels 132 are partially defined by tabs 133 formed on resilient cantilever members 130 connected to the mounting plates 126. The jacks 108 preferably have a similar profile as the mounting plates 126 that is formed as an integral part of the jacks 108.

Figure 8:
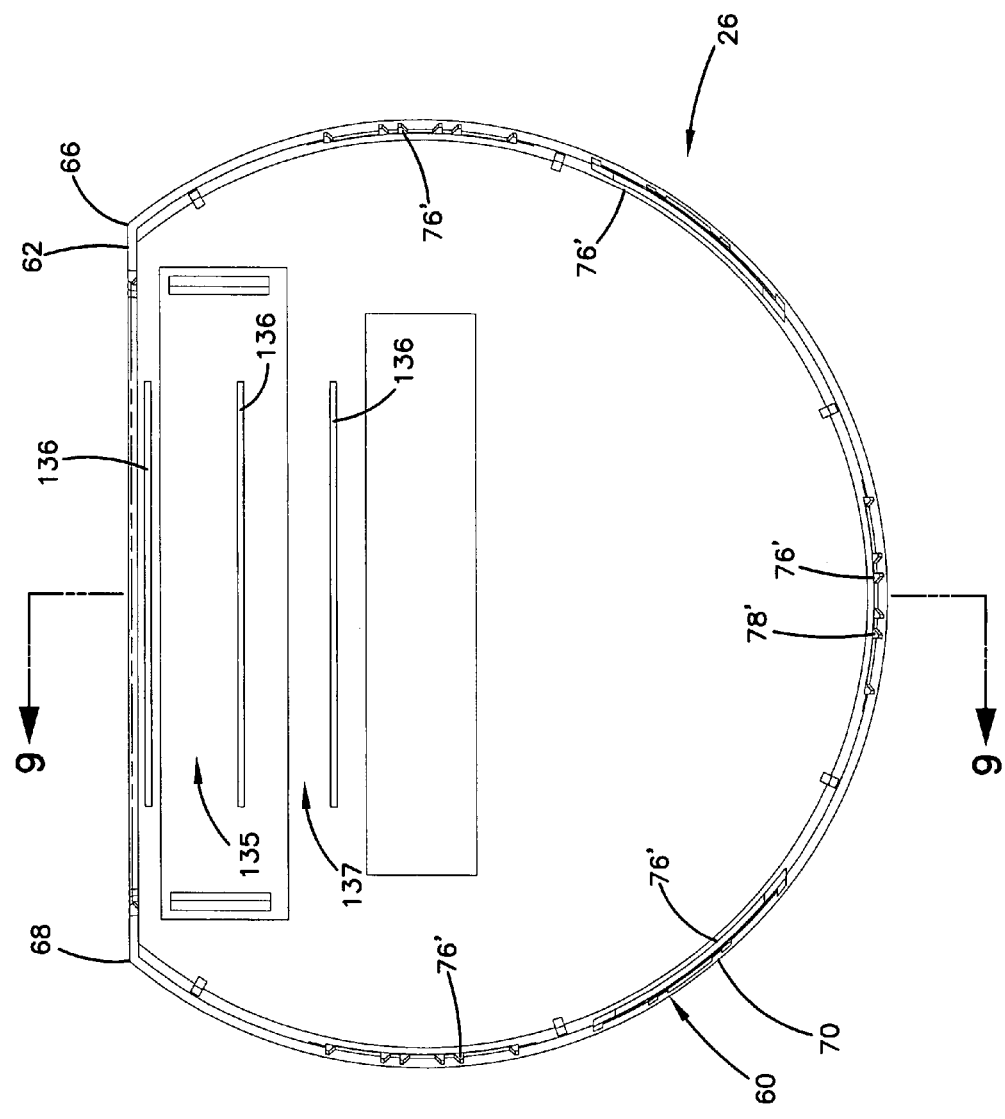
FIG. 8 is a bottom view of the cover of the outlet box of FIG. 1.

When the outlet box 20 is fully assembled, the upper ends (i.e., the free ends) of the dividers 198 are supported by structure provided at the underside of the housing cover 26. For example, referring to FIG. 8, the underside of the housing cover 26 includes three parallel, elongated shoulders 136 that define first and second elongated channels 135 and 137. When the connector holder 36 is mounted at the first mounting structure 82, the free ends of the dividers 98 fit within a first channel 135 of the cover 26. Similarly, when the connector holder 36 is mounted at the second mounting position 84, the free ends of the dividers 98 are supported within the second channel 137 of the cover 26.

The connectors 38 can be mounted in the connector holder 36 in one of two ways. First, the connectors 38 can be mounted in the connector holder 36 by removing the cover 26 of the housing 22, and then sliding the connectors downwardly into the channels 100 through the open upper ends of the channels 100. When a connector is inserted downwardly into one of the channels 100, the oppositely positioned first and second channels 132 and 134 defined by the connector profile receive the oppositely positioned front lips 124 of the channel into which the connector 38 is being inserted. With the front lips 124 captured within the channels 132 and 134, the connector 38 is firmly secured within the connector holder 36. After the connectors 38 have been loaded into the connector holder 36, the cover 126 is mounted on the base 28 of the housing 22 such that the open ends of the channels 100 are blocked. The open upper ends of the channels 100 also allow the connectors 38 to be removed from the connector holder 36 by removing the cover 26 from the base 28, and then sliding the connectors 38 upwardly out of the channels 100 formed between the dividers 98.

The flexible cantilever members 130 provided on the connectors 38 allow the connectors 38 to be inserted into the connector holder 36 and removed from the connector holder 36 without removing the cover 26 of the housing 22. For example, one of the connectors 38 can be mounted within the connector holder 36 by inserting the connector 38 laterally through the connector access opening 40. Preferably, the connector 38 is manipulated such that the second channel 134 of the connector receives one of the front lips 124 of the channel 100 into which the connector 38 is being mounted. Thereafter, the other side of the connector 38 is pressed into the channel 100 causing the locking tab 133 of the cantilever member 130 to snap past the oppositely positioned front lip 124. This causes the front lip 124 to be trapped within the first channel 132. To remove the connector from the connector holder 36, the cantilever member 130 is depressed such that the locking tab 133 of the cantilever member 130 clears its corresponding front lip 124. By depressing the cantilever member 130, the connector 38 can be pulled from the connector holder 36 through the connector access opening 40 without requiring the housing cover 26 to be removed.

Referring to FIG. 7, the base 28 of the housing 22 also includes structure for mounting the spools 34 within the housing 22. The structure includes two sets of spaced-apart resilient cantilevers 138 that project upward from the base 28. Each of the cantilevers 138 includes a free end adjacent to which a ramped locking shoulder 140 is provided. Each set of resilient cantilevers 138 is sized and shaped to snap-fit within corresponding openings 141 of one of the spools 34 as shown in FIG. 11. When the cantilevers 138 are snap-fit within the openings 141 of the spool 34, the locking shoulders 140 of the cantilevers 138 oppose corresponding retaining portions provided on the spool 34. As shown in FIG. 11, the spools 34 include central axes 160 that are aligned generally perpendicular to the base 28. The spool 34 is released from the cantilevers 138 by pressing the cantilevers 138 toward one another such that the locking shoulders 140 of the cantilevers 138 no longer oppose the retaining portions of the spool 34. With the cantilevers 138 pressed toward one another, the locking shoulders 140 are free to pass through the holes 141 defined by the spool 34.

Figure 12:
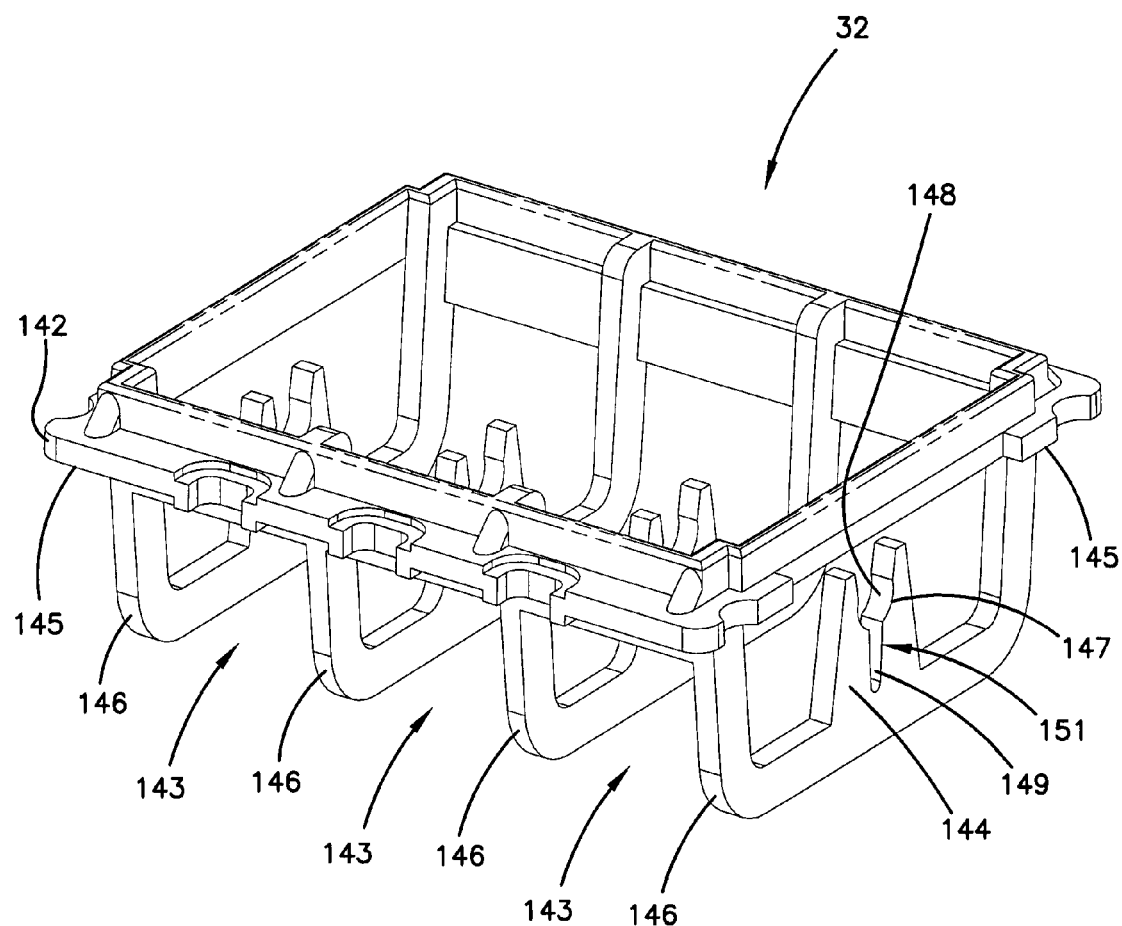
FIG. 12 is a perspective view of the cradle of the outlet box of FIG. 1.
Figure 13:
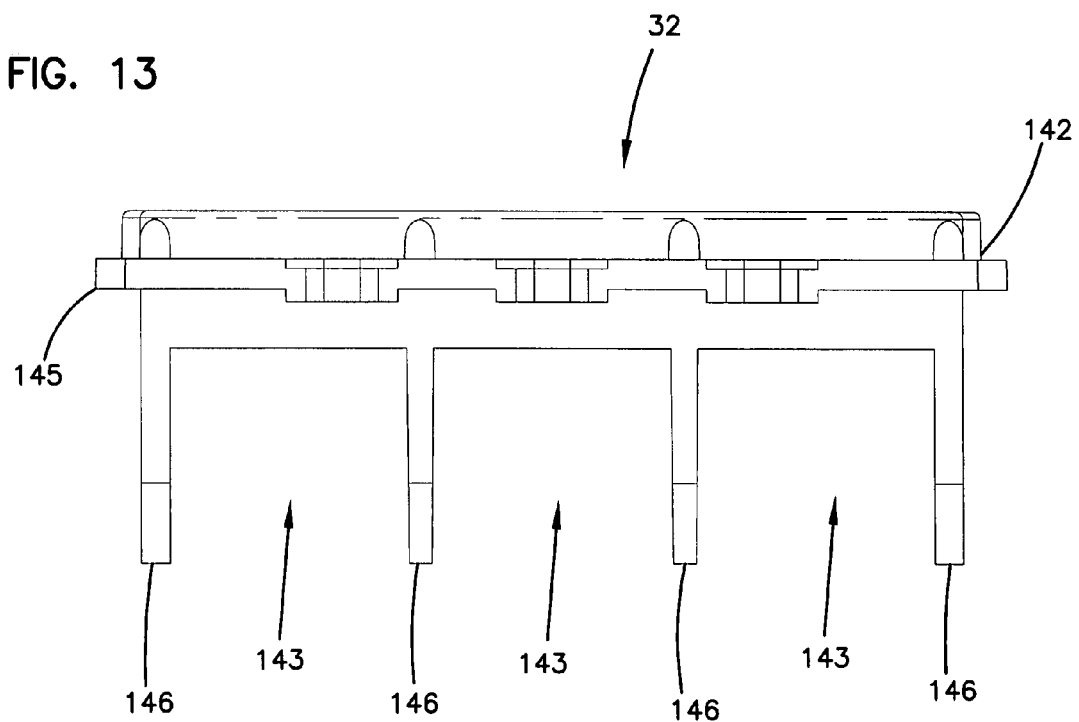
FIG. 13 is a front view of the cradle of the outlet box of FIG. 1.
Figure 15:
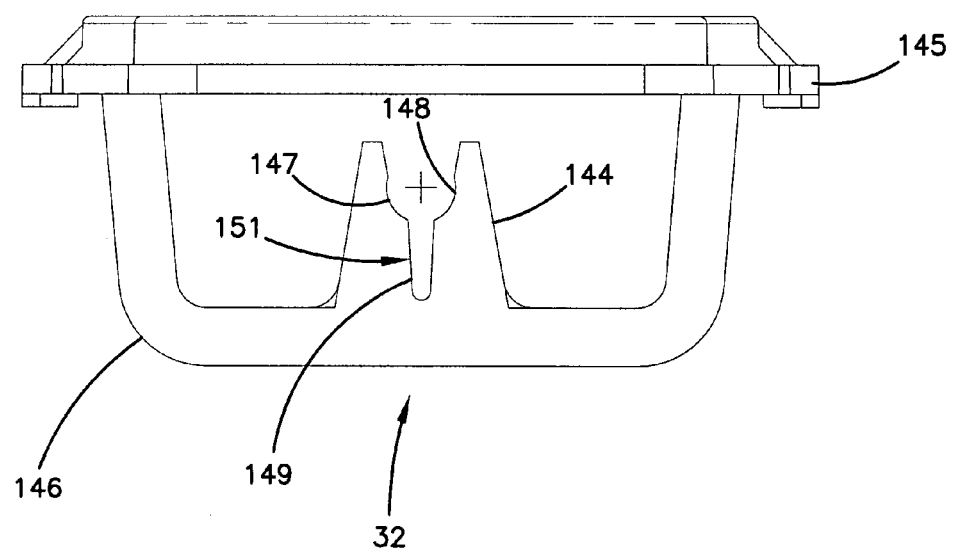
FIG. 15 is a side view of the cradle of the outlet box of FIG. 1.
Figure 14:
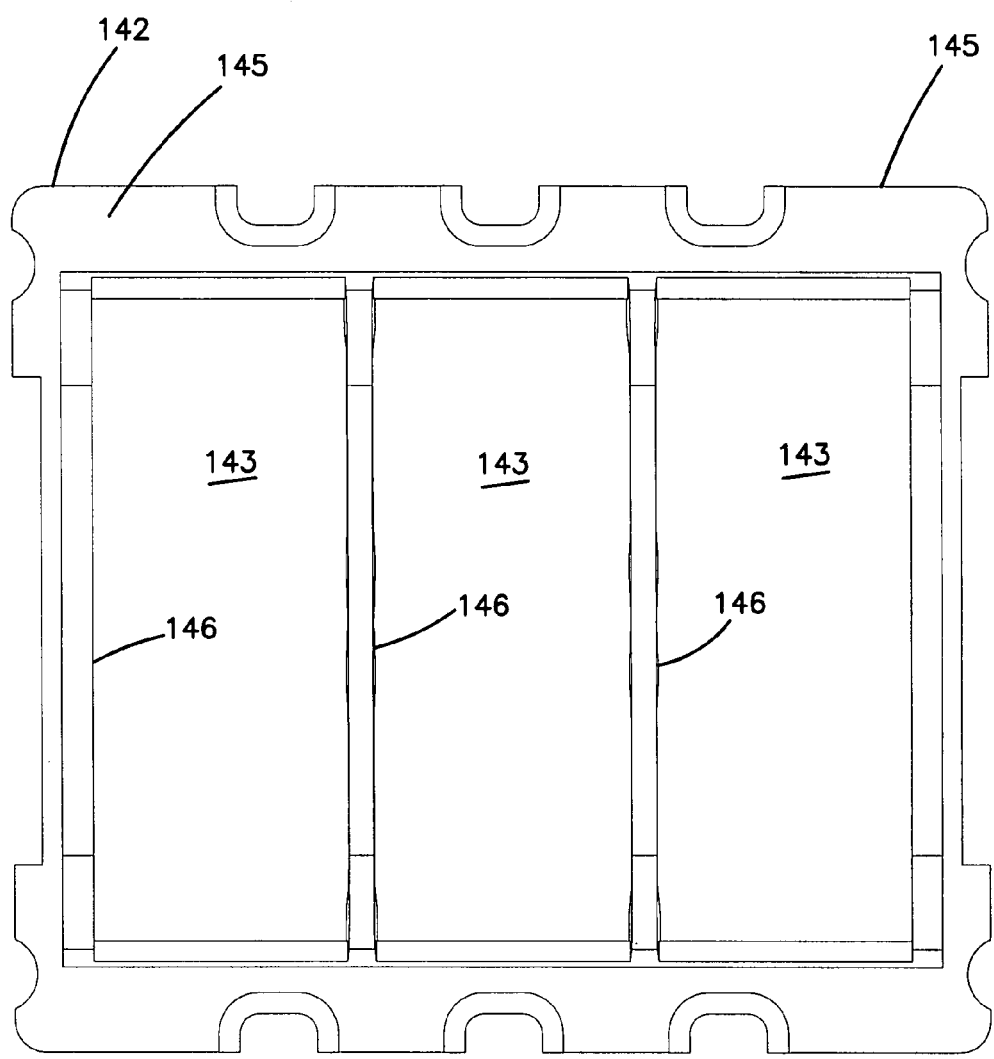
FIG. 14 is a bottom view of the cradle of the outlet box of FIG. 1.

Referring again to FIG. 1, the cradle 32 of the outlet box 20 includes a generally rectangular rim 142 having a flange 145 sized to seat on top of the base 28 when the cradle 32 is inserted into the main opening 30. As best shown in FIGS. 12-14, the cradle 32 includes a plurality of cradle members 146 that project downward from the rim 142. The cradle members 146 are each generally U-shaped and are aligned in spaced-apart parallel relation with respect to each other. Gaps 143 for receiving individual ones of the spools 34 are defined between the cradle members 142. Bearing structures 144 are provided on each of the cradle members 142 for supporting the spools 34. The bearing structures 144 extend upward from the cradle members 142 and define upwardly opening slots 151. Each of the slots 151 defines an enlarged, generally circular portion 147 defined by bearing surfaces 148. Each of the slots 151 also includes a narrow portion 149 located below the circular portion 147.

FIG. 5 shows the cradle 32 inserted within the main opening 30 of the base 28. Fasteners (not shown) can be inserted through notches 152 in the rim 142 of the cradle 32 to secure the cradle 32 to the base 28. Preferably, the notches 152 align with corresponding co-axially aligned openings defined by the base 28 and the enclosure 24 such that the fasteners function to fasten both the cradle 32 and the housing base 28 to the enclosure 24.

As shown in FIGS. 12-14, the cradle 32 is adapted for receiving three separate cable management spools 34. However, it will be appreciated that for smaller enclosures, the cradle can be configured for receiving only a single spool or two spools. Furthermore, for larger enclosures, the cradle 32 can be configured for receiving more than three spools 34.

Figure 16:
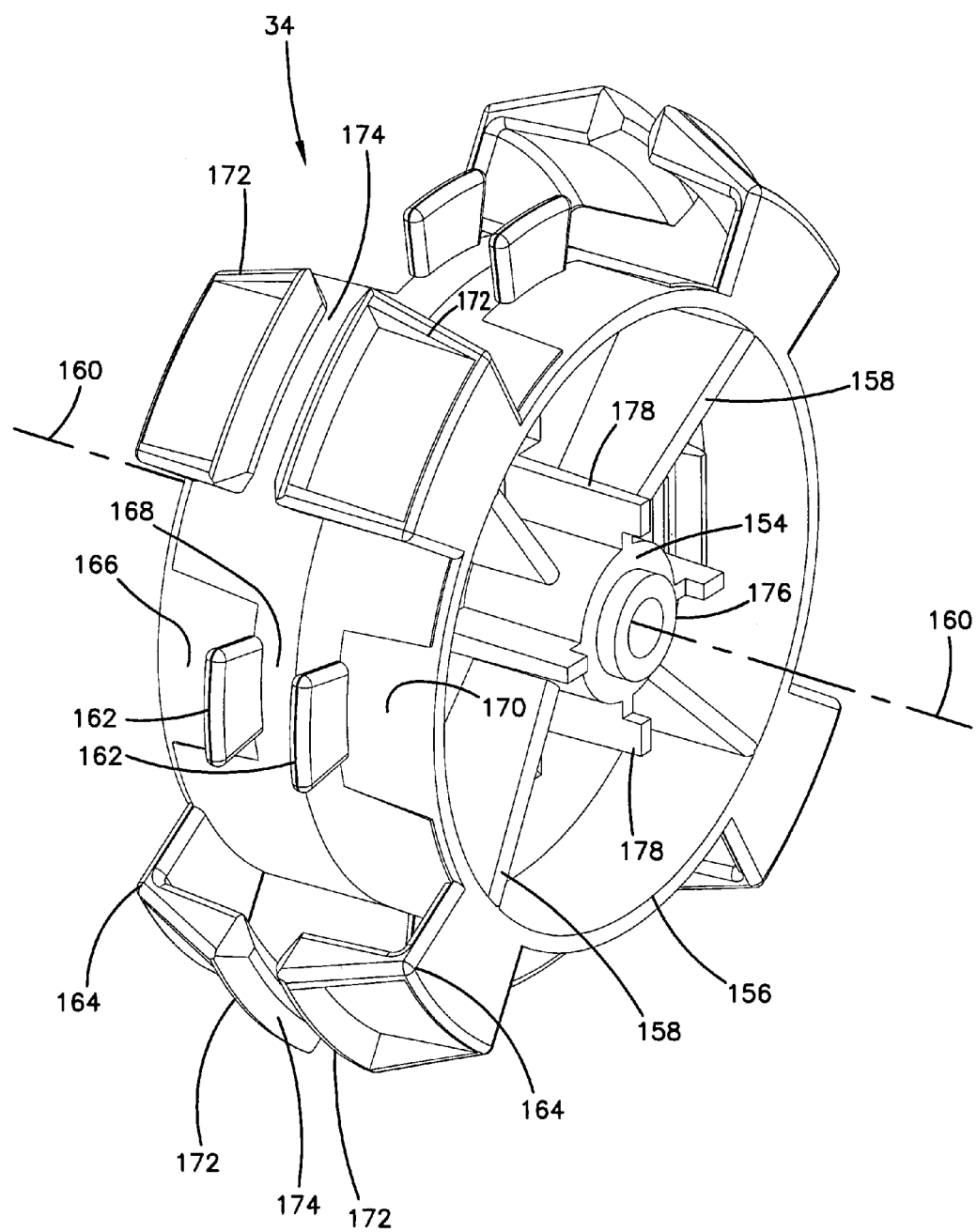
FIG. 16 is a perspective view of one of the spools of the outlet box of FIG. 1.
Figure 17:
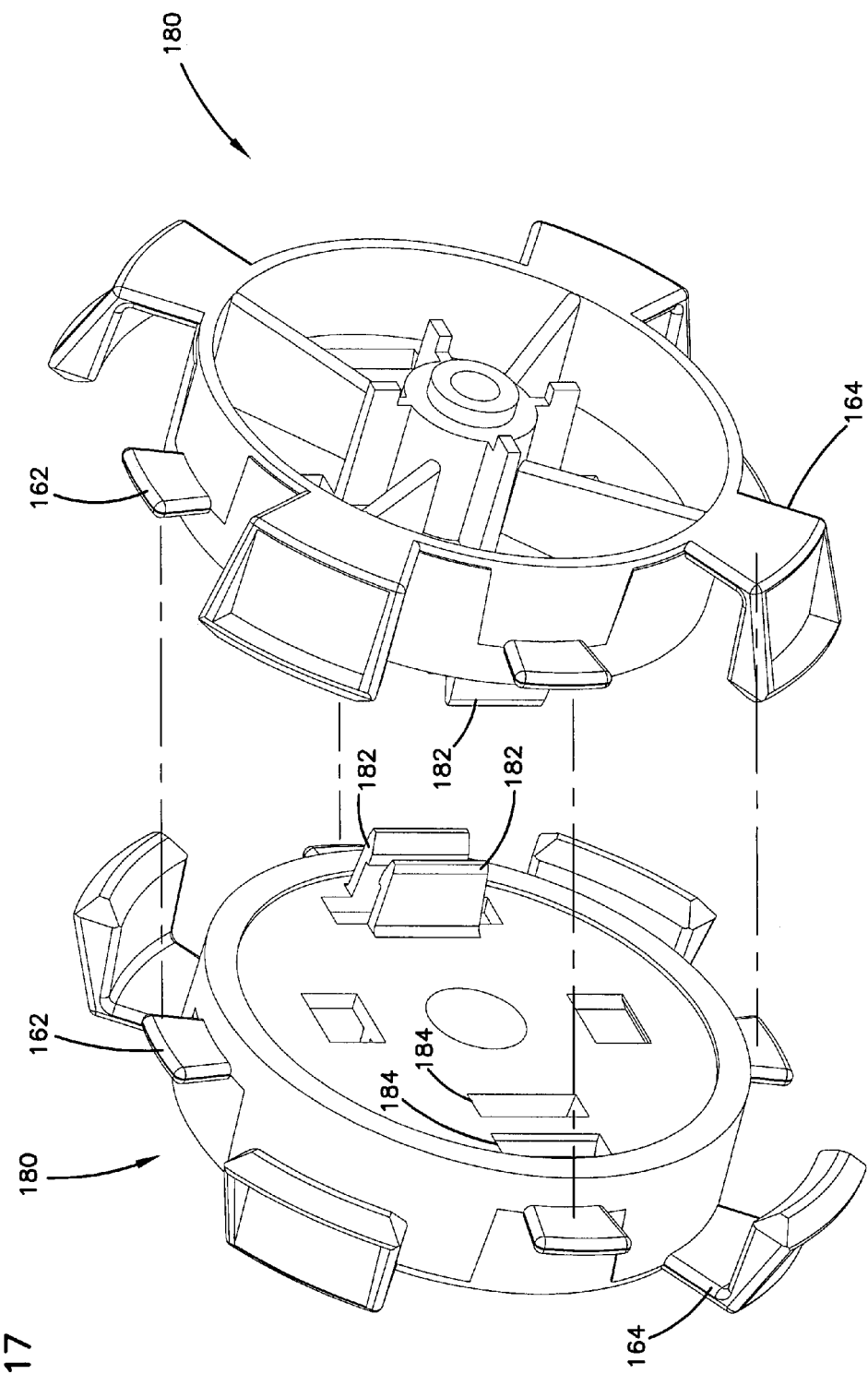
FIG. 17 is an exploded view of the spool of FIG. 16.

FIGS. 16 and 17 illustrate one of the cable management spools 34 in isolation from the outlet box 20. The depicted spool 34 includes a central hub 154 and a concentric outer rim 156. The hub is aligned along the central axis 160. A plurality of radial supports 158 interconnect the outer rim 156 to the central hub 154. Two sets of axially spaced-apart inner dividers 162 project radially outward from the outer rim 156. Similarly, two sets of axially spaced-apart outer dividers 164 project radially outward from the outer rim 156. The inner and outer dividers 162 and 164 cooperate to define first, second and third axially spaced-apart cable management channels 166, 168 and 170. The outer dividers 164 include end portions 172 that extend axially toward one another to at least partially enclose the channels 166, 168 and 170. Gaps 174 are provided between the end portions 172 for allowing cables to be inserted into the channels 166, 168 and 170. The channels 166, 168 and 170 function to segregate separate cables so as to reduce the likelihood that such cables become tangled or intertwined.

The spool 34 also includes axial posts 176 that project axially outward from the central hub 154, and radial locking members 178 that project radially outward from the central hub 154. The radial locking members 178 are located between the radial supports 158.

FIG. 17 shows that the spool 34 is formed by two identical half-pieces 180 that are snap-fit together. For example, each half piece 180 includes two resilient locking members 182 and two retaining openings 184. The half-pieces 180 are snap-fit together by aligning the locking members 182 with the retaining openings 184, and then axially pushing the two half-pieces 180 together such that the locking members 182 snap-fit within the retaining openings 184. By biasing the locking members 182 away from one another, the two half-pieces 180 can be disconnected from one another.

Figure 18:
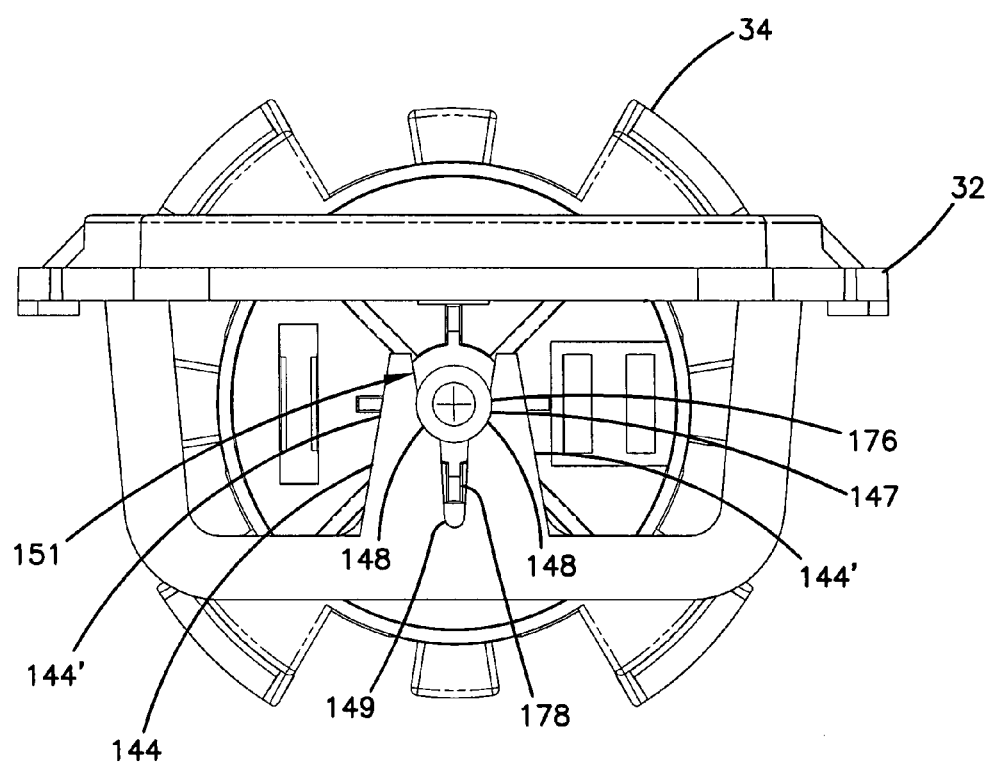
FIG. 18 is a side view showing the spool of FIG. 16 mounted in a cradle.

FIG. 18 shows the spool 34 mounted within the cradle 32. As so mounted, the axial posts 176 of the spool 34 are snap-fit within the enlarged, circular portions 147 of the slots 151 provided in the bearing structures 144. Preferably, the axial posts 176 rest upon the bearing surfaces 148 that define the enlarged portions 147 of the slots 151. Additionally, the radial locking projections 178 of the spool 34 fit within the narrow portions 149 of the slots 151 to inhibit rotation of the spool 34. When the posts 176 of the spool 34 are pressed into the slots 151, arms 144' of the bearing structure 144 flex away from one another to widen the slots a sufficient amount to allow the posts 176 to snap into the enlarged portions 147.

Figure 19:
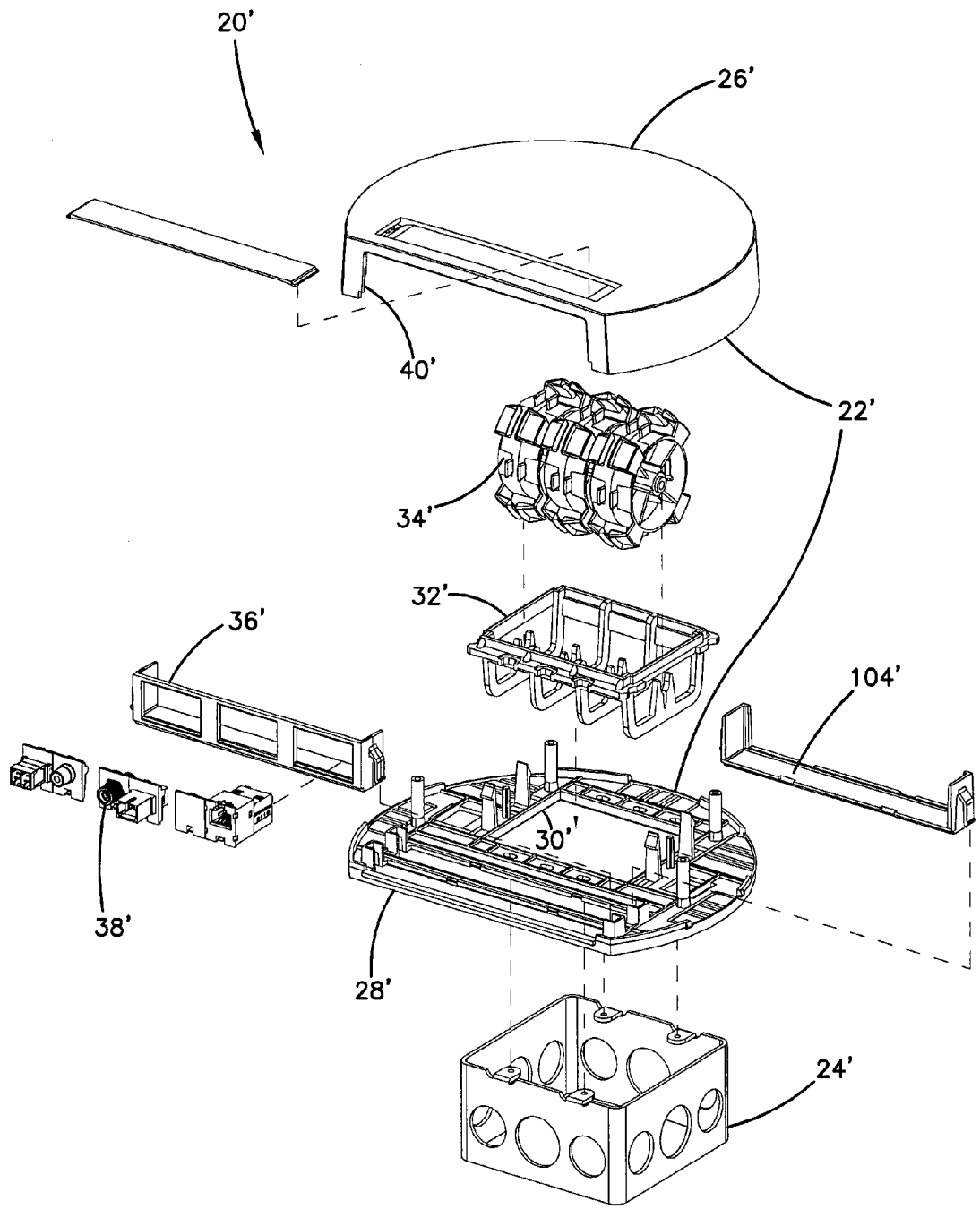
FIG. 19 is an exploded, perspective view of another outlet box constructed in accordance with the principles of the present invention.
Figure 20:
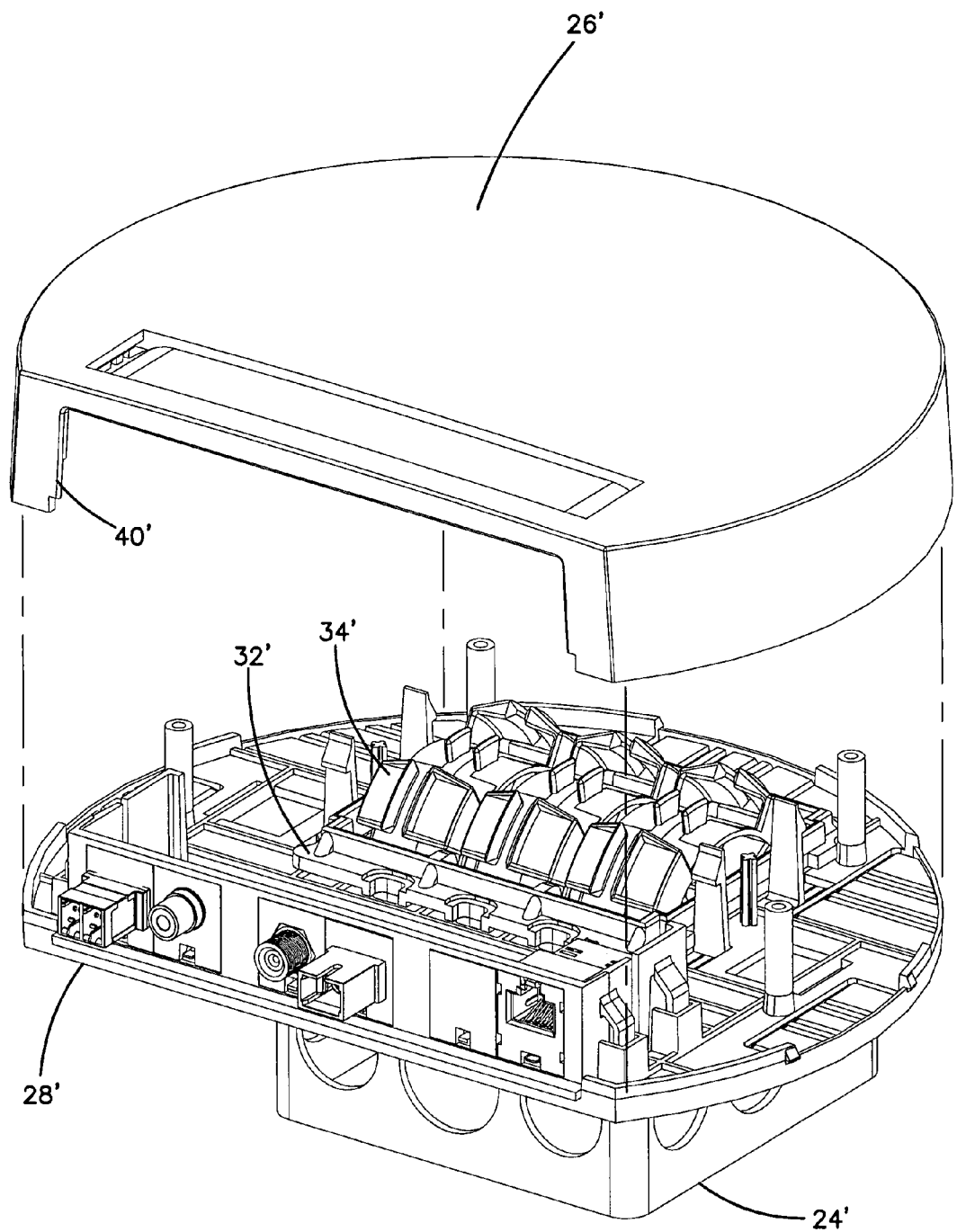
FIG. 20 is an assembled, perspective view of the outlet box of FIG. 19 with the cover removed.
Figure 21:
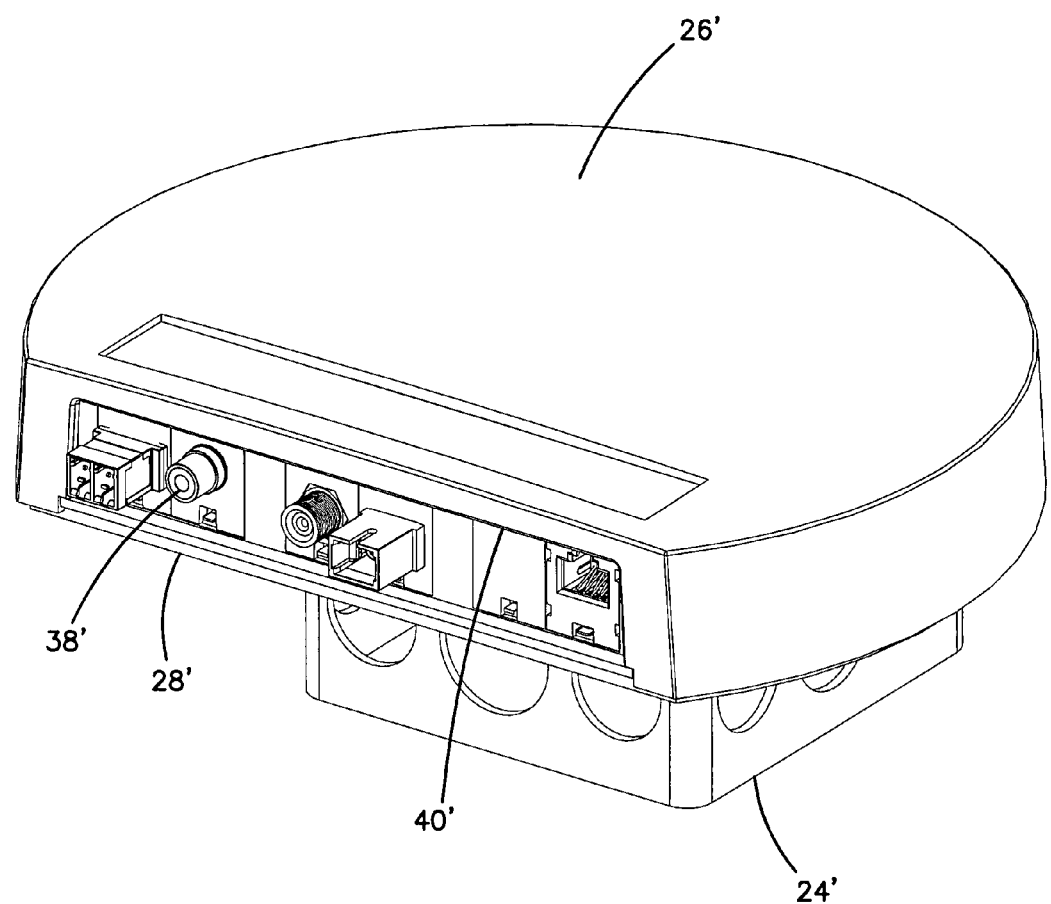
FIG. 21 is a perspective view of the outlet box of FIG. 20 with the cover connected to the base.

FIGS. 19-21 illustrate a six-port outlet box 20' constructed in accordance with the principles of the present invention. When describing the outlet box 20', components similar to those previously described with respect to the embodiment of FIG. 1 will be assigned like reference numerals with the addition of apostrophes to distinguish the embodiments.

The outlet box 20' includes a housing 22' having a low profile cover 26' and a base 28'. The housing 22' is adapted for connection to an enclosure 24'. The base 28' of the housing 22' defines a main opening 30' for providing communication between the interior of the enclosure 24' and the interior of the housing 22'. The outlet box 20' also includes a cradle 32' that fits in the main opening 30' and projects outside the housing 22'. A plurality of cable management spools 34' can be mounted within the cradle 32'. The outlet box 20' further includes a connector holder 36' having three horizontally elongated openings configured for receiving telecommunications connectors 38'. Dependent upon a user's preference, the connector holder 36' can be mounted to the base 28' at a location directly adjacent to an access opening 40' of the housing 22', or at a position recessed with respect to the access opening 40' of the housing 22'. When the connector holder 36' is mounted at one of the two positions, a blank 104' is preferably mounted at the non-occupied position.

Figure 22:
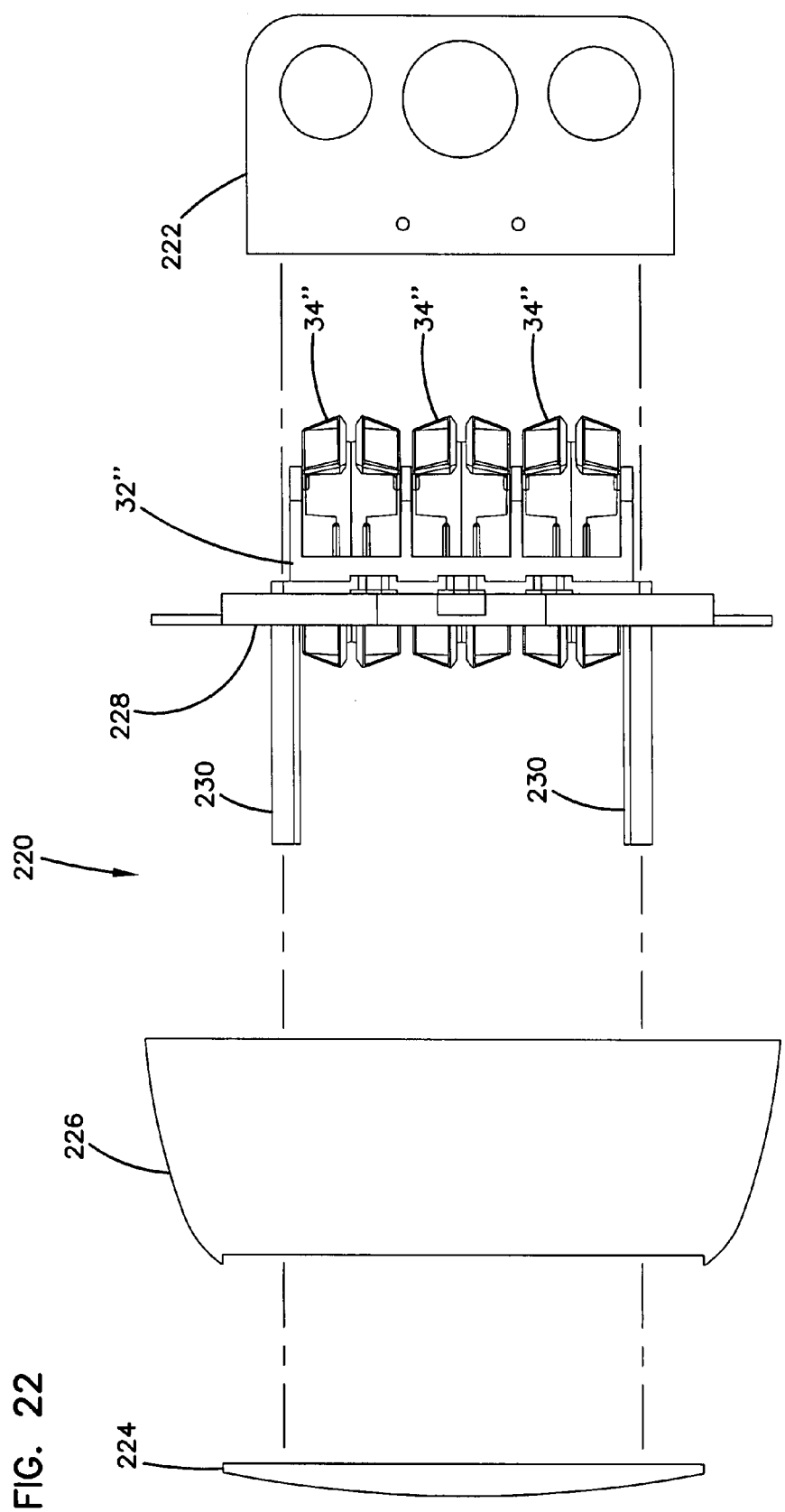
FIG. 22 is an exploded side view of another outlet box constructed in accordance with the principles of the present invention.

FIG. 22 illustrates a surface mount outlet box 220 constructed in accordance with the principles of the present invention. The outlet box 220 is adapted for connection to an enclosure 222 such as a NEMA box or a mud ring. The outlet box 220 includes a face plate 224, a main housing 226, a standoff 228 and a cradle 32". It will be appreciated that the face plate 224 functions as a connector holder. It will also be appreciated that the cradle 32" has substantially the same configuration as the cradle 32 described with respect to the embodiment of FIG. 1. As shown in FIG. 22, the cradle 32" holds three spools 34".

The cradle 32" is preferably fixedly connected to or formed as an integral piece with the standoff 228. However, in alternative embodiments, the cradle 32" can be a separate piece from the standoff 228.

Figure 23:
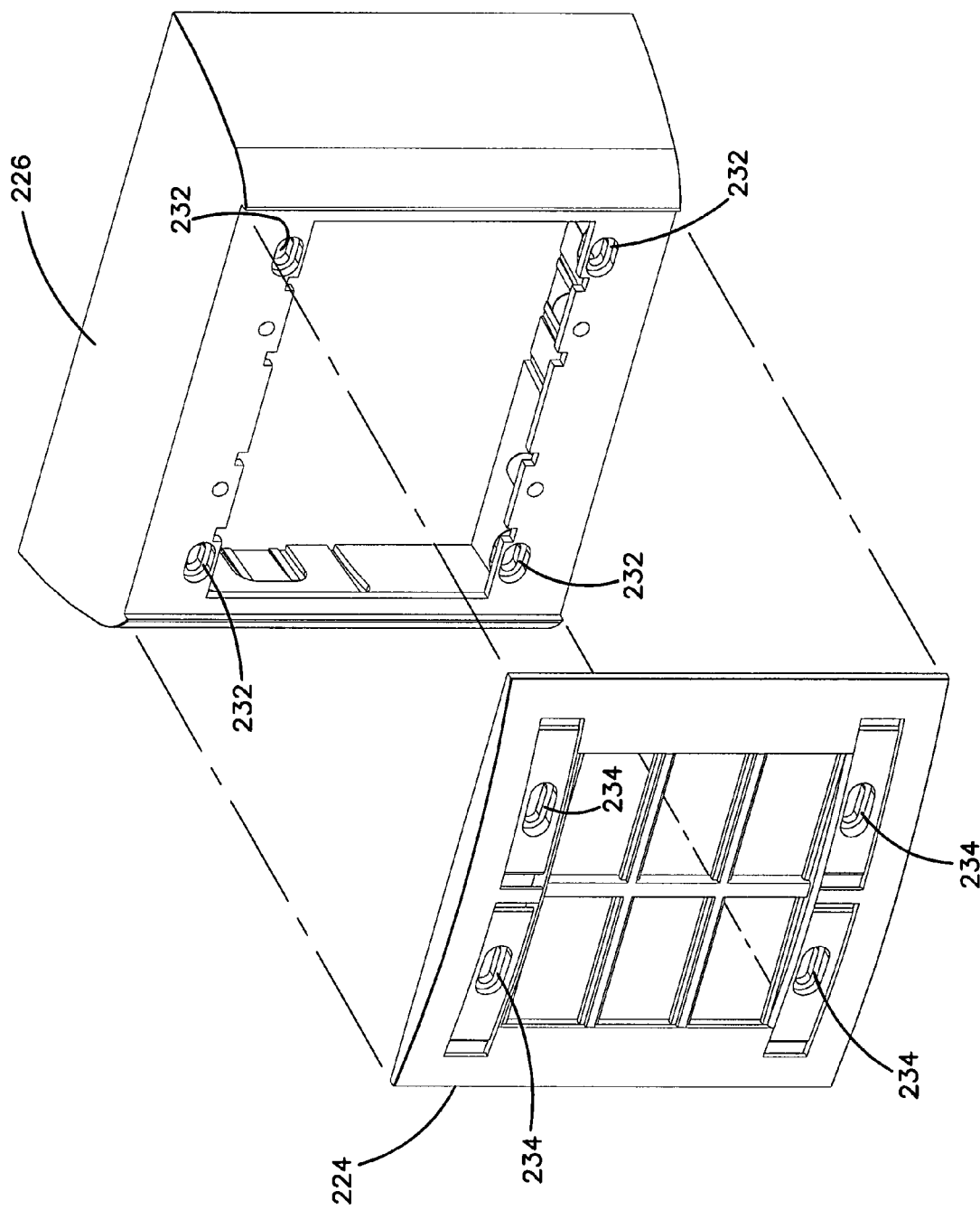
FIG. 23 is a perspective view of the housing and cover plate of the outlet box of FIG. 22.

To install the outlet box 220, the standoff 228 is first secured to the enclosure 222 (e.g., by fasteners) with the cradle 32" projecting into the enclosure 222. Excess cable can then be wrapped about one of the spools 34", and the spool 34" having the wrapped cable can be snapped within the cradle 32" that is already secured to the enclosure 222. The main housing 226 is then inserted over the standoff 228. As so inserted, four posts 230 (only 2 visible) of the standoff 228 align with openings 232 (shown in FIG. 23) of the main housing 226. The face plate 224 mounts in a recessed front of the main housing 226, and includes openings 234 that align with the openings 232 in the main housing 226. By inserting fasteners through the aligned openings 232, 234 and into the posts 230, both the face plate 224 and the main housing 226 can be fastened to the standoff 228.

Figure 24:
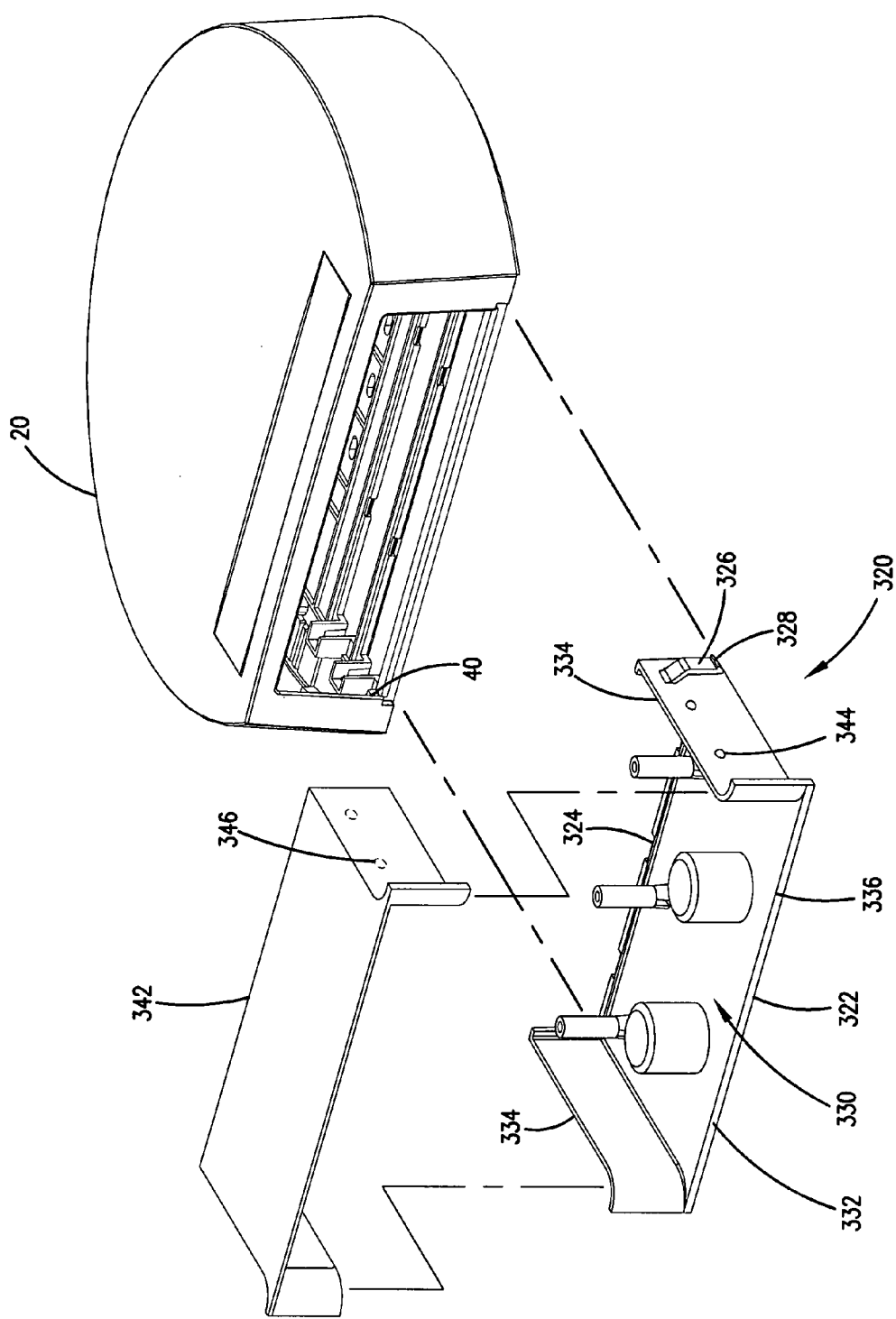
FIG. 24 is an exploded, perspective view of a cable guide constructed in accordance with the principles of the present invention.
Figure 25:
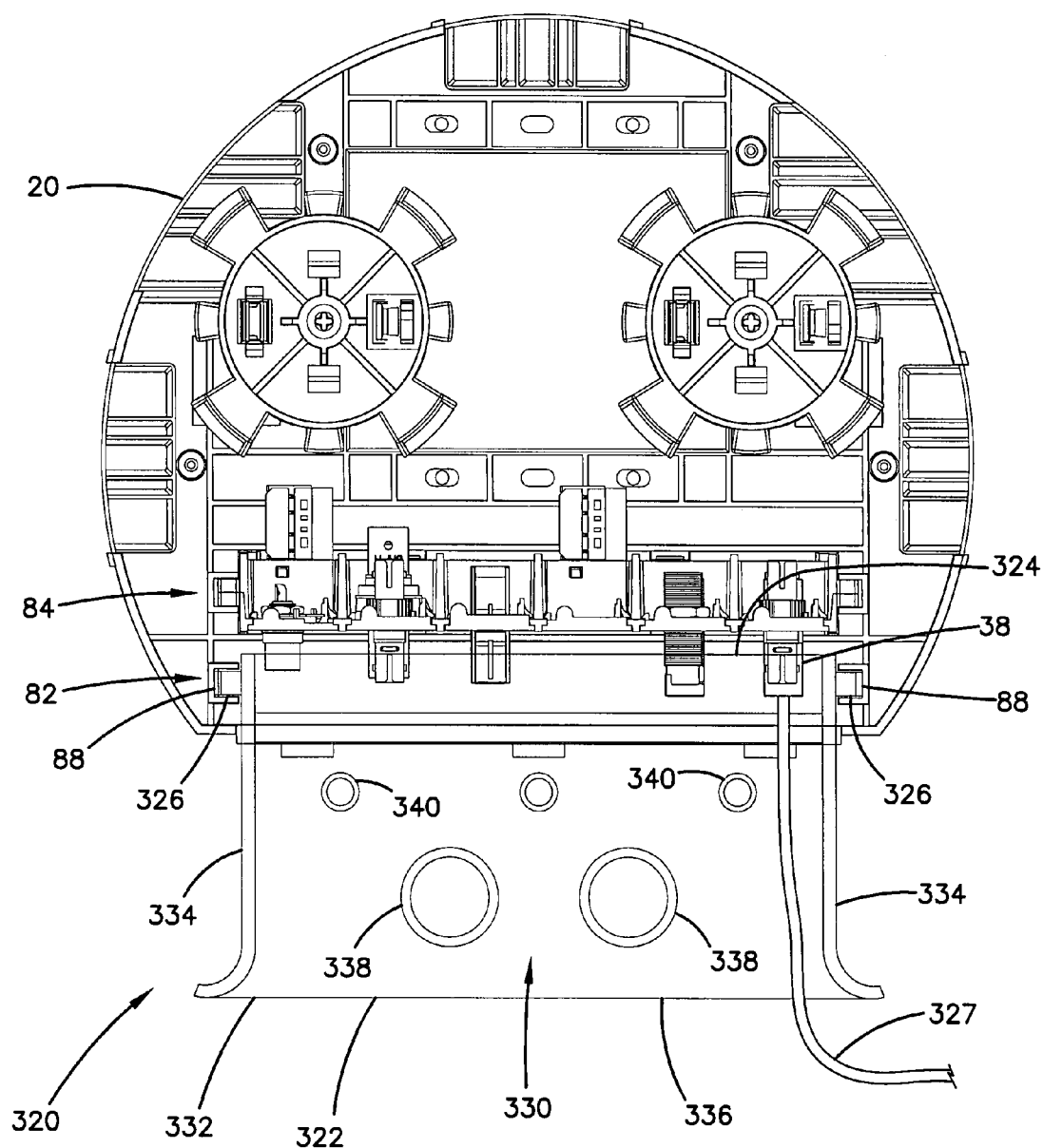
FIG. 25 is a plan view of the cable guide of FIG. 24, the cable guide is shown connected to an outlet box, the covers of both the outlet box and the cable guide have been removed for clarity.

FIGS. 24 and 25 show a cable guide 320 (e.g., a skirt, cable grooming device, shield, etc.) adapted for use with an outlet box such as the outlet box 20 (for clarity, the connectors 38 have been removed from the box 20 in FIG. 24). The cable guide 320 includes a base 322 adapted for connection to the outlet box 20. The base 322 has a first end 324 sized to be received in the connector access opening 40 of the outlet box 20. Downwardly extending resilient cantilevers 326 are provided on opposite sides of the base 322. The resilient cantilevers 326 include ramped locking tabs 328. As shown in FIG. 25, the base 322 can be connected to the outlet box 20 by inserting the first end 324 in the connector access opening 40 of the box 20, and then snap fitting the resilient cantilevers 326 within the upright channels 88 of the first mounting structure 82 of the outlet box 20. Consequently, the base 322 connects to the first mounting structure in a similar manner as the connector holder 36. Additionally, base 322 can have integrally formed structure (not shown) similar to the blank strip 104 that is capable of being snap fit in the rectangular opening 86 corresponding to the first mounting structure 82.

The base 322 defines a channel 330 for guiding cables that are connected to the connectors 38 of the outlet box 20. The channel 330 is defined by a main wall 332 and two spaced-apart side walls 334 that project transversely outward from the main wall 332. The size of the channel 330 between the two side walls 334 approximates the size of the length of the connector access opening 40. Adjacent a second end 336 of the base 322, the side walls taper or flair outward to increase the size of the channel 330 between the side walls 334. As shown in FIG. 25, the side walls 334 curve outward adjacent the second end 336 of the base 322. This curvature assists in preventing cables positioned within the channel 330 from being bent beyond minimum radius requirements.

The base 322 also includes cylindrical guides 338 that project outward from the main wall 334 and divide the channel 330 into three separate smaller channels. Cable tie-downs 340 are also provided in the channel for facilitating cable management.

Referring to FIG. 24, the cable guide 320 also includes a cover piece 342 that fits on the base 322 to enclose the channel 330. As shown, the cover 342 is connected to the base 322 by a snap-fit connection (e.g., dimples 344 on the base 322 snap within corresponding detents 346 formed on inner surfaces of the side walls of the cover 342). Alternatively, the cover 342 can be connected to the base 322 by other techniques such as a hinge, a press-fit connection, or other type of standard connecting method.

When connected to the outlet box 20 and enclosed by the cover 346, the cable guide 320 functions to guide and protect cables 327 extending outward or downward from the connectors 38. The guide 320 also inhibits contaminants from reaching the connection locations of the outlet box 20, and inhibits the connectors 38 from being damaged by side loading or other forced/impacts applied to the cables. Additionally, the guide 320 helps to prevent the cables from being excessively bent.

Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. An outlet box comprising:
   A) a connector holder for holding a plurality of telecommunications connectors;
   B) a housing defining a connector access opening;
   C) a first connector holder mount positioned at a first location within the housing that is adjacent to the connector access opening; and
   D) a second connector holder mount positioned at a second location within the housing that is recessed from the connector access opening relative to the first location, wherein a user can mount the connector holder at either one of the first connector holder mount and the second connector holder mount to enable connecting the telecommunications connectors to the connector holder through the connector access opening.

2. The outlet box as in claim 1, wherein the connector holder defines an array of openings in which the telecommunications connectors are mounted.

3. The outlet box as in claim 1, wherein the connector holder includes at least one retaining tab for releasably mounting the connector holder to the housing at one of the first and second connector holder mounts.

4. The outlet box as in claim 1, wherein the connector holder includes a plurality of spaced-apart dividers defining separate mounting channels.

5. The outlet box of claim 4, wherein each mounting channel has a closed end positioned opposite from an open end, the open ends being configured for allowing the telecommunications connectors to be mounted within the mounting channels by sliding the telecommunications connectors through the open ends.

6. The outlet box as in claim 1, wherein the connector holder includes an elongated base.

7. The outlet box of claim 6, wherein the base of the connector holder snap-fits within the first holder mount.

8. A method for assembling an outlet box including a housing defining a connector access opening, the housing also including a first connector mounting location positioned adjacent the connector access opening and a second connector mounting location, the method comprising:
   selecting one of the first and second connector mounting locations, the second connector mounting location being recessed within the housing from the connector access opening relative to the first connector mounting location; and
   mounting a connector holder adapted for holding a plurality of telecommunications connectors at the selected one of the first and second connector mounting locations, wherein the telecommunications connectors connect to the connector holder through the connector access opening.

9. The method of claim 8, further comprising mounting a blank strip at the other of the first and second connector mounting locations.

10. The method of claim 8, further comprising mounting telecommunications connectors to the connector holder.

11. The method of claim 8, wherein mounting the connector holder at the selected one of the first and second connector mounting locations comprises downwardly inserting a base of the connector holder into an opening defined at the selected connector mounting location.

12. The method of claim 11, wherein mounting the connector holder at the selected one of the first and second connector mounting locations further comprises concurrently downwardly inserting resilient tabs into upright channels at the selected connector mounting location.

13. The method of claim 12, wherein inserting the resilient tabs into the upright channels comprises snapping the resilient tabs into resilient notches defined in the opening.

14. An outlet box comprising:
   A) a connector holder for holding a plurality of telecommunications connectors;
   B) a housing defining a connector access opening, a first mounting location, and a second mounting location;
   C) means for mounting the connector holder at a first location in the housing that is adjacent to the connector access opening; and
   D) means for mounting the connector holder at a second location that is recessed within the housing from the connector access opening relative to the first locations, wherein a user can mount the connector holder at either one of the first and second locations to enable connecting the telecommunications connectors to the connector holder through the connector access opening.

15. The outlet box as in claim 14, wherein the connector holder defines an array of openings in which the telecommunications connectors are mounted.

16. The outlet box as in claim 14, wherein the connector holder includes at least one retaining tab for releasably mounting the connector holder to the housing at one of the first and second connector holder mounts.

17. The outlet box as in claim 14, wherein the connector holder includes a plurality of spaced-apart dividers defining separate mounting channels.

18. The outlet box of claim 17, wherein each mounting channel has a closed end positioned opposite from an open end, the open ends being configured for allowing the telecommunications connectors to be mounted within the mounting channels by sliding the telecommunications connectors through the open ends.

19. The outlet box as in claim 14, wherein the connector holder includes an elongated base.

20. The outlet box of claim 19, wherein the base of the connector holder snap-fits within the first holder mount.

* * * * *